US012545023B2

(12) United States Patent
Hong et al.

(10) Patent No.: US 12,545,023 B2
(45) Date of Patent: Feb. 10, 2026

(54) INKJET PRINTING APPARATUS AND METHOD FOR MANUFACTURING DISPLAY DEVICE

(71) Applicant: Samsung Display Co., LTD., Yongin-si (KR)

(72) Inventors: Hye Jung Hong, Cheonan-si (KR); Hyun Min Cho, Seoul (KR); Jong Hyuk Kang, Suwon-si (KR); Hee Yeon Yoo, Hwaseong-si (KR); Yo Han Lee, Hwaseong-Si (KR); Jae Hoon Jung, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 179 days.

(21) Appl. No.: 18/004,032

(22) PCT Filed: Jun. 4, 2021

(86) PCT No.: PCT/KR2021/007021
§ 371 (c)(1),
(2) Date: Dec. 30, 2022

(87) PCT Pub. No.: WO2022/005034
PCT Pub. Date: Jan. 6, 2022

(65) Prior Publication Data

US 2023/0256735 A1 Aug. 17, 2023

(30) Foreign Application Priority Data

Jul. 2, 2020 (KR) ........................ 10-2020-0081398

(51) Int. Cl.
*B41J 2/045* (2006.01)
*B41J 2/17* (2006.01)
(Continued)

(52) U.S. Cl.
CPC ....... *B41J 2/04563* (2013.01); *B41J 2/04528* (2013.01); *B41J 2/1707* (2013.01); *B41J 2/175* (2013.01); *B41J 2/18* (2013.01)

(58) Field of Classification Search
CPC ........................................................ B41J 2/175
See application file for complete search history.

(56) References Cited

U.S. PATENT DOCUMENTS 6,007,193 A * 12/1999 Kashimura .......... B41J 2/17593 347/92
10,987,923 B2 4/2021 Sato
(Continued)

FOREIGN PATENT DOCUMENTS

CN 111038106 A 4/2020
JP 2004-165140 A 6/2004
(Continued)

OTHER PUBLICATIONS

International Search Report for corresponding PCT/KR2021/007021, Sep. 10, 2021. 4 pp.

*Primary Examiner* — Shelby L Fidler
(74) *Attorney, Agent, or Firm* — Womble Bond Dickinson (US) LLP

(57) ABSTRACT

An inkjet printing apparatus includes: a print head device including an inkjet head to spray a composition for ink including a plurality of bipolar elements; an ink circulation device including an ink storage to store the composition for ink, and transfer the composition for ink to the print head device; an ink injection device to inject the composition for ink into the ink storage; and a temperature adjusting device to adjust a temperature of the composition for ink. The temperature adjusting device includes: a first temperature adjusting device to adjust a temperature to be included in a first reference temperature range; a second temperature adjusting device to adjust a temperature to be included in a
(Continued)

second reference temperature range; and a third temperature adjusting device to adjust a temperature to be included in a third reference temperature range.

18 Claims, 26 Drawing Sheets

(51) Int. Cl.

| | |
|---|---|
| ***B41J 2/175*** | (2006.01) |
| ***B41J 2/18*** | (2006.01) |

(56) References Cited

U.S. PATENT DOCUMENTS

| | | | | |
|---|---|---|---|---|
| 12,004,412 | B2 | 6/2024 | Jeong et al. | |
| 2005/0100660 | A1 | 5/2005 | Ito et al. | |
| 2010/0110155 | A1 | 5/2010 | Delueg | |
| 2011/0180526 | A1* | 7/2011 | Wayman | B41J 2/17593 219/438 |
| 2012/0105520 | A1 | 5/2012 | Shimoda et al. | |
| 2017/0232755 | A1* | 8/2017 | Fujita | B41J 11/0021 347/7 |
| 2020/0114644 | A1 | 4/2020 | Sato | |
| 2020/0346479 | A1* | 11/2020 | Schmid | B42D 25/41 |
| 2023/0391102 | A1* | 12/2023 | Osawa | B41J 2/17596 |

FOREIGN PATENT DOCUMENTS

| | | | |
|---|---|---|---|
| KR | 2009-0015335 | A | 2/2009 |
| KR | 10-2050778 | B1 | 12/2019 |
| KR | 2020-0034897 | A | 4/2020 |
| WO | WO 2020/059994 | A1 | 3/2020 |

* cited by examiner

INKJET PRINTING APPARATUS AND METHOD FOR MANUFACTURING DISPLAY DEVICE

CROSS REFERENCE TO RELATED APPLICATIONS

This application is a U.S. National Phase Patent Application of International Patent Application No. PCT/KR2021/007021, filed on Jun. 4, 2021, which claims priority to Korean Patent Application No. 10-2020-0081398, filed on Jul. 2, 2020, in the Korean Intellectual Property Office (KIPO), the entire content of all of which are incorporated by reference herein.

BACKGROUND

1. Field

Aspects of embodiments of the present disclosure relate to an inkjet printing apparatus, and a method for manufacturing a display device.

2. Description of the Related Art

The importance of display devices has steadily increased with the development of multimedia technology. In response thereto, various types of display devices, such as an organic light emitting display (OLED), a liquid crystal display (LCD) and the like, have been used.

A display device is a device for displaying an image, and includes a display panel, such as an organic light emitting display panel or a liquid crystal display panel. The light emitting display panel may include light emitting elements (e.g., light emitting diodes (LED)), and examples of the light emitting diode include an organic light emitting diode (OLED) using an organic material as a fluorescent material, and an inorganic light emitting diode using an inorganic material as a fluorescent material.

The above information disclosed in this Background section is for enhancement of understanding of the background of the present disclosure, and therefore, it may contain information that does not constitute prior art.

SUMMARY

Embodiments of the present disclosure are directed to an inkjet printing apparatus capable of adjusting a precipitation speed of bipolar elements and/or controlling a movement speed of a composition for ink for each area of the inkjet printing apparatus by including a temperature adjusting unit for controlling a temperature for each area to adjust a viscosity of the composition for ink.

Embodiments of the present disclosure are directed to a method for manufacturing a display device including a light emitting element using an inkjet printing apparatus.

It should be noted that the aspects and features of the present disclosure are not limited to those above, and other aspects and features, which are not explicitly described herein, will be apparent to those of ordinary skill in the art from the below description.

According to one or more embodiments of the present disclosure, an inkjet printing apparatus includes: a print head device including an inkjet head configured to spray a composition for ink including a plurality of bipolar elements; an ink circulation device including an ink storage configured to store the composition for ink, and transfer the composition for ink to the print head device; an ink injection device configured to inject the composition for ink into the ink storage; and a temperature adjusting device configured to adjust a temperature of the composition for ink. The temperature adjusting device includes: a first temperature adjusting device configured to adjust a temperature of a first composition for ink in the print head device to be included in a first reference temperature range; a second temperature adjusting device configured to adjust a temperature of a second composition for ink in the ink storage to be included in a second reference temperature range; and a third temperature adjusting device configured to adjust a temperature of a third composition for ink in the ink injection device to be included in a third reference temperature range.

In an embodiment, the third reference temperature range may be a temperature region higher than the first reference temperature range and the second reference temperature range.

In an embodiment, the first reference temperature range may be a temperature region higher than the second reference temperature range.

In an embodiment, a viscosity of the third composition for ink in the ink injection device may be smaller than a viscosity of the first and second compositions for ink in the print head device and the ink storage.

In an embodiment, the viscosity of the first composition for ink in the print head device may be smaller than the viscosity of the second composition for ink in the ink storage.

In an embodiment, the inkjet printing apparatus may further include a controller configured to control the temperature adjusting device, and the controller may be configured to control each temperature of the first to third compositions for ink by controlling the temperature adjusting device.

In an embodiment, the inkjet printing apparatus may further include: a first temperature sensor configured to sense the temperature of the first composition for ink in the print head device; a second temperature sensor configured to sense the temperature of the second composition for ink in the ink storage; and a third temperature sensor configured to sense the temperature of the third composition for ink in the ink injection device.

In an embodiment, the controller may be configured to compare a measured temperature of the first composition for ink sensed by the first temperature sensor with the first reference temperature range, and control the first temperature adjusting device so that the temperature of the first composition for ink may be included in the first reference temperature range.

In an embodiment, the controller may be configured to compare a measured temperature of the second composition for ink sensed by the second temperature sensor with the second reference temperature range, and control the second temperature adjusting device so that the temperature of the second composition for ink may be included in the second reference temperature range.

In an embodiment, the controller may be configured to compare a measured temperature of the third composition for ink sensed by the third temperature sensor with the third reference temperature range, and control the third temperature adjusting device so that the temperature of the third composition for ink may be included in the third reference temperature range.

In an embodiment, the inkjet printing apparatus may further include: an ink preparation device configured to store the composition for ink, and transfer the composition for ink to the ink injection device; and a fourth temperature adjusting device configured to adjust a temperature of a fourth composition for ink in the ink preparation device to be included in a fourth reference temperature range.

In an embodiment, the fourth reference temperature range may be lower than the first to third reference temperature ranges.

In an embodiment, a viscosity of the fourth composition for ink may be greater than viscosities of the first to third compositions for ink.

In an embodiment, the fourth reference temperature range may be a temperature lower than a melting point temperature of the composition for ink.

According to one or more embodiments of the present disclosure, an inkjet printing apparatus includes: a spray area, a circulation area, and an injection area; an inkjet head in the spray area, and configured to spray a composition for ink including a plurality of bipolar elements; an ink circulation device in the circulation area, and configured to supply the composition for ink to the inkjet head, and receive the composition for ink from the inkjet head remaining after being sprayed; an ink injection device in the injection area, and configured to provide the composition for ink to the ink circulation device; and a temperature adjusting device configured to adjust a temperature of each of the spray area, the circulation area, and the injection area. The temperature adjusting device includes: a first temperature adjusting device configured to adjust a first temperature of the spray area to be included in a first reference temperature region; a second temperature adjusting device configured to adjust a second temperature of the circulation area to be included in a second reference temperature region; and a third temperature adjusting device configured to adjust a third temperature of the injection area to be included in a third reference temperature region.

In an embodiment, the third reference temperature region may be a temperature region higher than the first and second reference temperature regions, and the first reference temperature region may be a temperature region higher than the second reference temperature region.

In an embodiment, a viscosity of the composition for ink in the third reference temperature region may be lower than viscosities of the composition for ink in the first and second reference temperature regions, and the viscosity of the composition for ink in the first reference temperature region may be lower than the viscosity of the composition for ink in the second reference temperature region.

In an embodiment, the first to third reference temperature regions may be temperatures higher than a melting point temperature of the composition for ink.

According to one or more embodiments of the present disclosure, a method for manufacturing a display device, includes: forming a first electrode and a second electrode on a target substrate; spraying a composition for ink on the target substrate at a temperature within a first reference temperature region, the composition for ink including a plurality of light emitting elements, and a solvent in which the light emitting elements are dispersed; and seating the light emitting elements on the first electrode and the second electrode.

In an embodiment, the spraying of the composition for ink may include controlling a temperature of the composition for ink to be included in the first reference temperature region.

In an embodiment, when the temperature of the composition for ink is not included in the first reference temperature region, the method may further include adjusting, by a temperature adjusting device, the temperature of the composition for ink.

In an embodiment, the first reference temperature region may be a temperature higher than a melting point temperature of the composition for ink.

The above and other aspects, features, and embodiments of the present disclosure are included in the detailed description and the accompanying drawings.

The inkjet printing apparatus according to one or more embodiments of the present disclosure may include a temperature adjusting unit (e.g., a temperature adjusting device) for controlling a temperature for each area of the inkjet printing apparatus, thereby controlling a viscosity of a composition for ink including the bipolar elements. Therefore, as a precipitation speed of the bipolar elements dispersed in the ink may be adjusted and/or a moving speed of the composition for ink is controlled for each area in a printing process, an inkjet printing process may be performed by providing the composition for ink having improved (e.g., excellent) quality.

Accordingly, in the method for manufacturing a display device using an inkjet printing apparatus according to one or more embodiments, the number of light emitting elements included in discharged ink may be uniformly or substantially uniformly maintained, and the display device including the light emitting element manufactured using the inkjet printing apparatus may have improved light emission reliability for each pixel.

The aspects and features of the present disclosure are not limited to those described above, and other aspects and features are included in the present disclosure, as described in more detail below with reference to the drawings.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
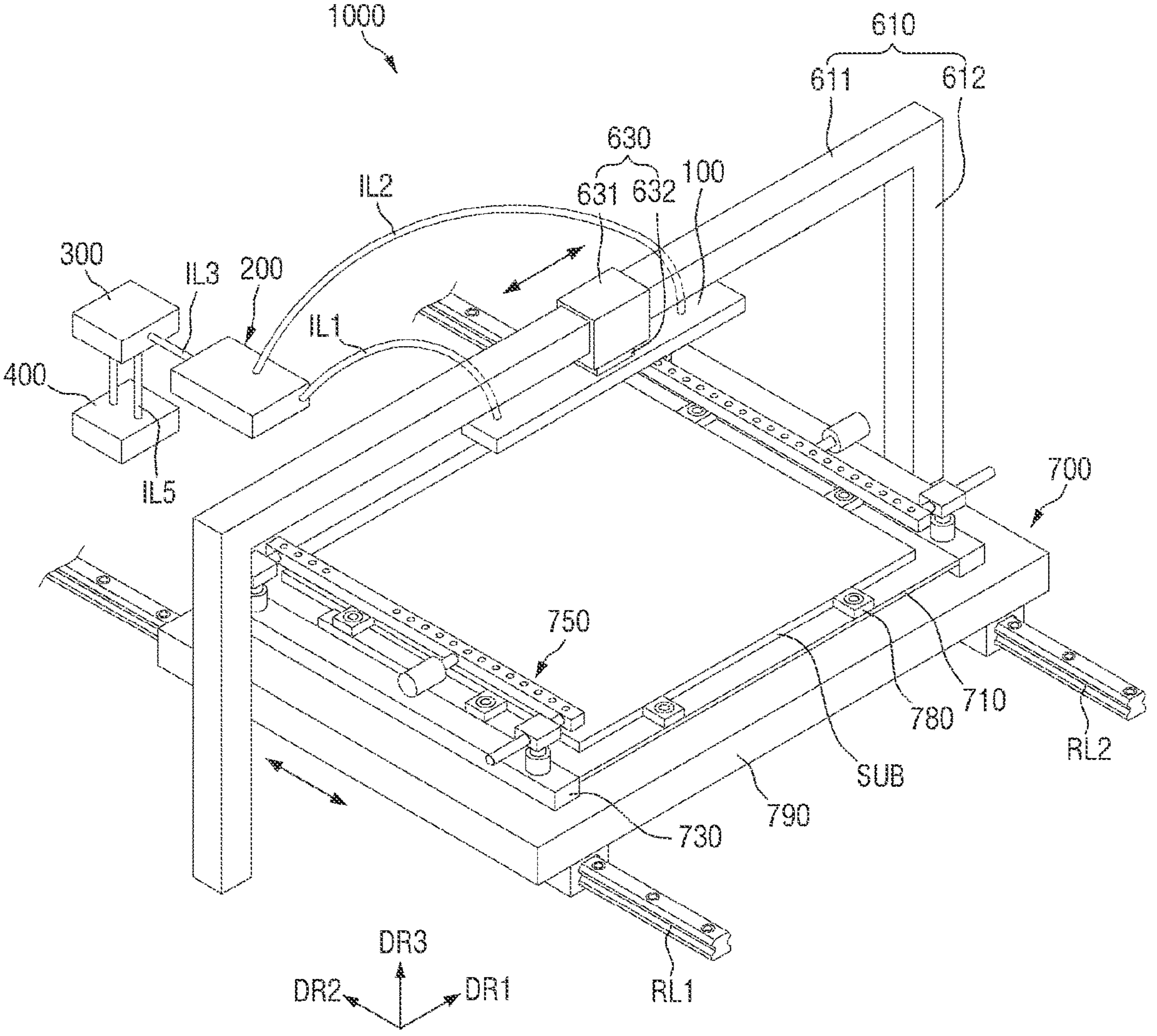
FIG. 1 is a perspective view of an inkjet printing apparatus according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
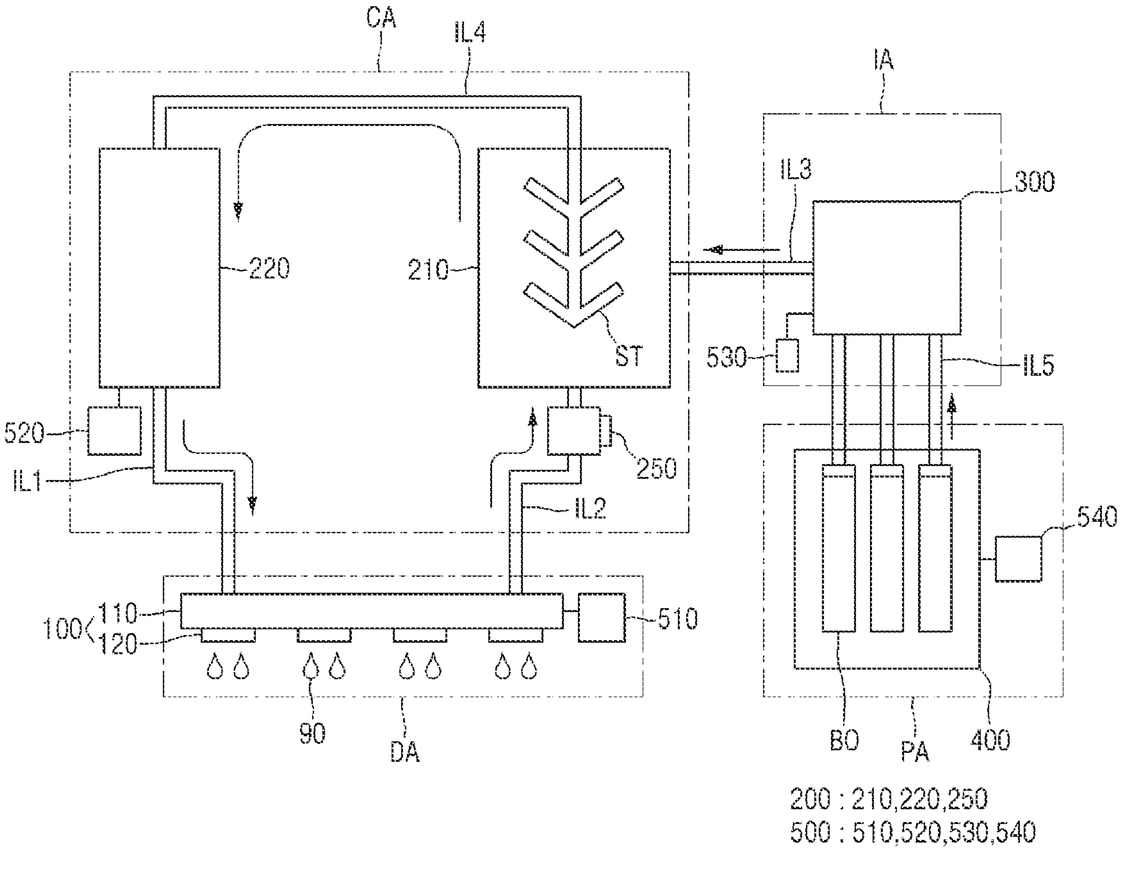
FIG. 2 is a partial side view of the inkjet printing apparatus of FIG. 1.
Figure 3:
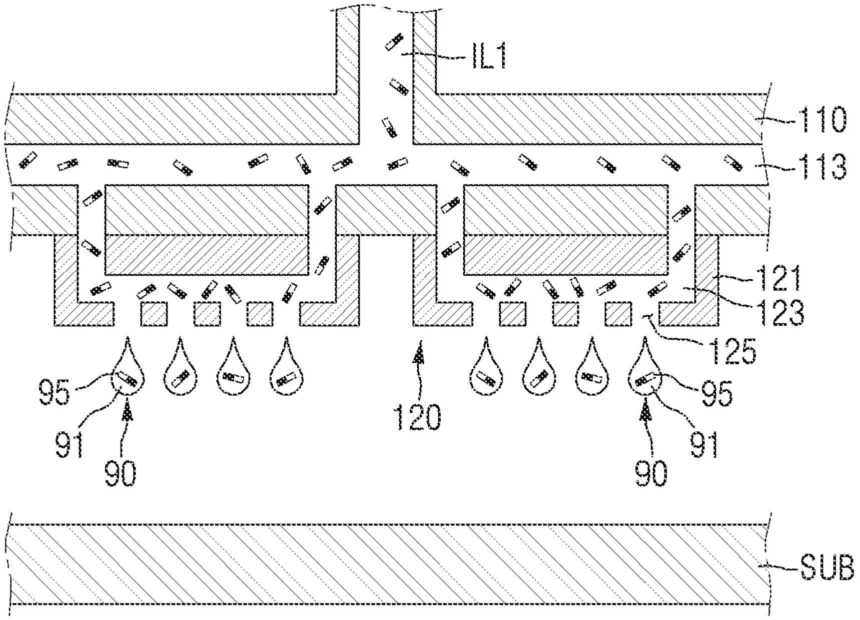
FIG. 3 is a cross-sectional view of a print head unit according to an embodiment.

FIG. 1 is a perspective view of an inkjet printing apparatus according to an embodiment. FIG. 2 is a partial side view of the inkjet printing apparatus of FIG. 1. FIG. 3 is a cross-sectional view of a print head unit according to an embodiment.

An inkjet printing apparatus 1000 according to an embodiment may spray a composition for ink (e.g., a predetermined composition for ink) on a target substrate, and may align particles, for example, such as bipolar elements, dispersed in the composition for ink on the target substrate. Here, the inkjet printing apparatus 1000 may adjust a viscosity of the composition for ink in order to maintain or substantially maintain the same or substantially the same number of particles in the composition for ink in each process. On the other hand, the viscosity of the composition for ink including a plurality of particles may be different depending on a temperature of the composition for ink. In other words, the inkjet printing apparatus 1000 may include a temperature adjusting unit (e.g., a temperature adjuster, a temperature adjusting part, or a temperature adjusting device) capable of adjusting the temperature of the composition for ink for each area, thereby, differently adjusting the temperature of the composition for ink position in the area where each process is performed. Therefore, the inkjet printing apparatus 1000 according to an embodiment may control the viscosity of the composition for ink by differently adjusting the temperature of the composition for ink using the temperature adjusting unit. The temperature of the composition for ink adjusted by the temperature adjusting unit may be a temperature corresponding to the viscosity of the composition for ink that satisfies an optimum or improved condition corresponding to each process.

Referring to FIGS. 1 to 3, the inkjet printing apparatus 1000 according to an embodiment includes a print head unit (e.g., a print head, a print head part, or a print head device) 100 including a plurality of inkjet heads 120, an ink circulation unit (e.g., an ink circulator, an ink circulation part, or an ink circulation device) 200, an ink injection unit (e.g., an ink injector, an ink injection part, or an ink injection device) 300, and a temperature adjusting unit (e.g., a temperature adjustor, a temperature adjusting part, or a temperature adjusting device) 500. The inkjet printing apparatus 1000 may further include a stage unit (e.g., a stage part or a stage assembly) 700 and an ink preparation unit (e.g., an ink preparer, an ink preparation part, or an ink preparation device) 400.

In the drawings, a first direction DR1, a second direction DR2, and a third direction DR3 are illustrated. The first direction DR1 and the second direction DR2 are located on one plane, and are orthogonal or substantially orthogonal to each other. The third direction DR3 is perpendicular to or substantially perpendicular to the first direction DR1 and the second direction DR2.

The stage unit 700 provides a space in which a target substrate SUB is disposed. The target substrate SUB may be disposed on the stage unit 700 while a printing process is performed.

An overall planar shape of the stage unit 700 may follow a planar shape of the target substrate SUB. For example, when the target substrate SUB has a rectangular shape, the overall shape of the stage unit 700 may be rectangular. As another example, when the target substrate SUB has a circular shape, the overall shape of the stage unit 700 may be circular. In the drawings, for convenience of illustration, a rectangular shaped stage unit 700 is illustrated having a long side disposed in the first direction DR1, and a short side disposed in the second direction DR2.

The stage unit 700 may include a base frame 790, a stage 710 disposed on the base frame 790, and a probe unit (e.g., a probe or a probe part) 750. The stage unit 700 may further include a probe support 730 and an aligner 780.

The inkjet printing apparatus 1000 may further include a first rail RL1 and a second rail RL2 extending in the second direction DR2. The stage unit 700 is disposed on the first rail RL1 and the second rail RL2. The stage unit 700 may move along the second direction DR2 through moving members on the first rail RL1 and the second rail RL2. The stage unit 700 moves along the second direction DR2, and passes through the print head unit 100, which will be described in more detail below, and as a result, a composition 90 for ink may be sprayed thereon. The composition 90 for ink sprayed from the print head unit 100 may be in a solution state or a colloid state. Although a structure in which the stage unit 700 moves along the second direction DR2 is illustrated in the drawings, in some embodiments, the stage unit 700 may be fixed, and the print head unit 100 may be moved instead. In this case, the print head unit 100 may be mounted on a frame disposed on the first rail RL1 and the second rail RL2.

The stage unit 700 may perform a printing process on the entire or substantially the entire area of the target substrate SUB, while moving in the second direction DR2.

The structure of the stage unit 700 will be described in more detail below with reference to some of the other drawings.

The print head unit 100 serves to print the composition 90 for ink on the target substrate SUB. The print head unit 100 may spray the composition 90 for ink onto the target substrate SUB when the inkjet printing apparatus 1000 is driven.

The inkjet printing apparatus 1000 may further include an ink providing unit, such as an ink cartridge, and the composition 90 for ink supplied from the ink providing unit may be sprayed (e.g., discharged) toward the target substrate SUB through the print head unit 100. In an embodiment, the ink providing unit of the inkjet printing apparatus 1000 may include the ink circulation unit 200 and the ink injection unit 300, and the print head unit 100 may be supplied with the composition 90 for ink from the ink circulation unit 200 described in more detail below. The print head unit 100 may spray (e.g., discharge) the composition 90 for ink supplied from the ink circulation unit 200 toward the target substrate SUB.

The composition 90 for ink provided from the ink circulation unit 200 to the print head unit 100 may be in a solution state or a colloid state. The composition 90 for ink may include a solvent 91, and a plurality of bipolar elements 95 included in the solvent 91. However, the state of the composition 90 for ink provided to the inkjet printing apparatus 1000 is not limited to the solution state or the colloid state. The state of the composition 90 for ink may be different for each area of the inkjet printing apparatus 1000. The composition for ink 90 provided to the inkjet printing apparatus 1000 may be in a solid state, in a solution state, or in a colloid state, depending on the temperature and pressure of the composition 90 for ink. The state of the composition 90 for ink for each area of the inkjet printing apparatus 1000 will be described in more detail below.

The solvent 91 may be a material that is vaporized or volatilized by room temperature or heat. The plurality of bipolar elements 95 may be dispersed in the solvent 91. The bipolar element 95 may be a solid material that finally remains on the target substrate SUB after the solvent 91 is removed. For example, the solvent 91 may include acetone, water, alcohol, toluene, propylene glycol (PG), triethylene glycol monobutyl ether (TGBE), diethylene glycol monophenyl ether (DGPE), amide-based compounds, dicarbonyl-based compounds (e.g., diethylene glycol dibenzoate), tricarbonyl-based compounds (e.g., triethyl citrate), phthalate-based compounds (e.g., benzyl butyl phthalate, bis(2-ethylhexyl) phthalate, bis(2-ethylhexyl) isophthalate, ethyl phthalyl ethyl glycolate, or the like), or propylene glycol methyl acetate (PGMA).

The bipolar element 95 may be an object having one end having a first polarity, and another end having a second polarity different from the first polarity. For example, one end of the bipolar element 95 may have a positive polarity, and the other end of the bipolar element 95 may have a negative polarity. The bipolar element 95 having different polarities at both (e.g., opposite) ends receive electrical forces (e.g., attraction and repulsion) when placed in an electric field, so that an orientation direction thereof may be controlled.

The bipolar element 95 may be a light emitting diode. For example, the bipolar element 95 may be an inorganic light emitting diode having a size of a micrometer to a nanometer (e.g., having a size in the range of micrometers to nanometers), and including (e.g., made of) an inorganic material. In an embodiment, the bipolar element 95 may have a columnar shape or a rod shape extending in one direction. However, the shape of the bipolar element 95 is not limited thereto, and the bipolar element 95 may have various suitable shapes. For example, the bipolar element 95 may have various suitable shapes, such as a shape of a suitable polygonal prism, such as a cube, a rectangular parallelepiped, or a hexagonal prism, or a shape extending in one direction and having an outer surface that is partially inclined.

As described above, in the present embodiment, the composition 90 for ink may include the solvent 91, and the bipolar elements 95 dispersed in the solvent 91. However, a degree of dispersion of the bipolar elements 95 dispersed in the solvent 91 may be different over time. For example, the bipolar elements 95 dispersed in the solvent 91 may be precipitated or sedimented in the solvent 91 over time. Therefore, the degree of dispersion of the bipolar elements 95 dispersed in the solvent 91 may be different over time, and accordingly, in the printing process using the inkjet printing apparatus 1000, the number of bipolar elements 95 included per unit volume of the composition 90 for ink may be different depending on a process point in time, so that reliability of the printing process may be reduced. The inkjet printing apparatus 1000 according to an embodiment may adjust a viscosity of the composition 90 for ink in order to control a precipitation speed of the bipolar elements 91 in the composition 90 for ink for each area of the inkjet printing apparatus 1000. For example, the viscosity of the composition for ink 90 may be adjusted by adjusting the temperature of the composition for ink 90. This will be described in more detail below.

The print head unit 100 is disposed on the stage unit 700. The print head unit 100 may be mounted on a moving unit (e.g., a mover, a moving assembly, or a moving device) 630 disposed on the support 610.

The support 610 may include a horizontal support portion 611 extending in the first direction DR1, which may be a horizontal direction, and a vertical support portion 612 connected to the horizontal support portion 611, and extending in the third direction DR3, which may be a vertical direction. An extension direction of the horizontal support portion 611 may be the same or substantially the same as the first direction DR1, which is a long side direction of the stage unit 700. The print head unit 100 may be mounted on the moving unit 630 disposed on the horizontal support portion 611.

The moving unit 630 may include a moving portion 631 mounted on the horizontal support portion 611 and capable of moving along one direction (e.g., the first direction DR1), and a fixing portion 632 disposed on a lower surface of the moving portion 631. The print head unit 100 may be mounted on the fixing portion 632. The moving portion 631 may move along the first direction DR1 on the horizontal support portion 611, and the print head unit 100 may be fixed to the fixing portion 632, so as to move along the first direction DR1 together with the moving portion 631.

The print head unit 100 may be mounted on the moving unit 630 disposed on the support 610, to be spaced apart from the stage unit 700 by a separation distance (e.g., a predetermined distance). The separation distance between the print head unit 100 and the stage unit 700 may be adjusted by a height of the vertical support portion 612 of the support 610. The separation distance between the print head unit 100 and the stage unit 700 may be adjusted within a range in which the print head unit 100 has a suitable interval (e.g., a predetermined or certain interval) from the target substrate SUB when the target substrate SUB is disposed on the stage unit 700, to secure the space used for the printing process.

The print head unit 100 may include a first base portion 110, and the plurality of inkjet heads 120 positioned on a bottom surface of the first base portion 110.

The first base portion 110 may have a shape extending in one direction. For example, an extension direction of the first base portion 110 may be the same as the extension direction of the horizontal support portion 611. As illustrated in the drawings, the first base portion 110 may include a long side extending in the first direction DR1, and a short side extending in the second direction DR2. However, the shape of the first base portion 110 is not limited thereto.

A partially protruding area may be formed on an upper surface of the first base portion 110, and the first base portion 110 may be connected to a first connection tube IL1 in the protruding area. The first base portion 110 may include a first inner tube 113 connected to the first connection tube IL1 therein, and the composition 90 for ink transferred from the ink circulation unit 200 may move to the first inner tube 113 through the first connection tube IL1.

The plurality of inkjet heads 120 may be disposed on a lower surface of the first base portion 110, and may be arranged along the direction in which the first base portion 110 extends. The plurality of inkjet heads 120 may be arranged in one column or a plurality of columns, and while the drawings illustrate that four inkjet heads 120 are all arranged along the first direction DR1, the number of the inkjet heads is not limited thereto. The inkjet heads 120 may be disposed to be spaced apart from each other.

The inkjet head 120 may include a second base portion 121, a second inner tube 123 in the second base portion 121, and a plurality of nozzles 125.

The composition 90 for ink transferred from the first base portion 110 may be sprayed through the nozzles 125. Each nozzle 125 may be connected to the second inner tube 123 of the inkjet head 120. The composition 90 for ink may be supplied to the second inner tube 123 of the inkjet head 120, and the supplied composition for ink 90 may flow along the second inner tube 123 to be sprayed through each of the nozzles 125. The composition 90 for ink sprayed through the nozzle 125 may be supplied to an upper surface of the target substrate SUB. A spray amount of the composition 90 for ink through the nozzles 125 may be adjusted according to a voltage applied to an individual nozzle (e.g., to each individual nozzle) 125. In an embodiment, the one-time discharge amount of each nozzle 125 may be 1 to 50 picoliter (pl), but the present disclosure is not limited thereto.

Referring to FIG. 2, the inkjet printing apparatus 1000 may include a spray area DA, a circulation area CA, an injection area IA, and a preparation area PA.

The spray area DA may be an area from which the composition 90 for ink is sprayed. The above-described print head unit 100 may be disposed in the spray area DA. The print head unit 100 may be disposed in the spray area DA to spray the composition 90 for ink including the plurality of bipolar elements 95 through the nozzles 125 of the inkjet head 120.

The circulation area CA may be an area in which the composition 90 for ink provided to the print head unit 100 is circulated. The composition 90 for ink including the bipolar elements 95 is circulated in the circulation area CA, so that a variation in the number of bipolar elements 95 included in the composition 90 for ink may be reduced or minimized.

The injection area IA may be an area that receives the composition 90 for ink from an ink bottle BO provided in the inkjet printing apparatus 1000, and provides the composition 90 for ink to the circulation area CA. In an embodiment, by maintaining or substantially maintaining a temperature of the preparation area PA below a melting point temperature of the composition for ink 90, which will be described in more detail below, the composition 90 for ink stored or kept in the ink bottle BO disposed in the preparation area PA may be in a solid state, or a liquid state having high viscosity. The injection area IA may be an area in which the composition 90 for ink provided from the preparation area PA is completely melted in a liquid or colloid state having low viscosity, and introduced into the circulation area CA.

As described above, the viscosity of the composition 90 for ink may be different depending on the temperature of the composition 90 for ink. For example, the viscosity of the composition 90 for ink may decrease as the temperature increases. As used in the present specification, the expression the ‘composition 90 for ink having high viscosity’ may refer to a composition 90 for ink having a low temperature, and includes a ‘composition 90 for ink having high viscosity in a liquid state’, as well as a ‘composition 90 for ink in a solid state’. A temperature of the ‘composition 90 for ink in the solid state’ may be a temperature below the melting point of the composition 90 for ink.

The preparation area PA may be an area for storing at least one ink bottle BO before or during the printing process. The inkjet printing process may be performed using the inkjet printing apparatus 1000 when the ink bottle BO for storing the pre-prepared composition 90 for ink is provided to the preparation area PA. In addition, the preparation area PA may be an area in which the ink bottle BO is stored under a suitable condition (e.g., a predetermined condition), so that precipitation or sedimentation of the bipolar elements 95 may not occur, in order to improve the reliability of the printing process. For example, as described above, the bipolar elements 95 included in the composition 90 for ink may be precipitated or sedimented in the solvent 91 over time. The preparation area PA may be an area in which the ink bottle BO is stored, while maintaining or substantially maintaining a constant or substantially constant degree of dispersion of the bipolar elements 95 of the composition 90 for ink stored in the ink bottle BO by preventing or substantially preventing the bipolar elements 95 included in the composition 90 for ink from being precipitated in the solvent 91, as the temperature of the preparation area PA is maintained or substantially maintained below the melting point temperature of the composition 90 for ink, even during the printing process, to maintain or substantially maintain the high viscosity of the composition 90 for ink.

The preparation area PA may be provided as a separate device, and may not be included in the inkjet printing apparatus 1000.

The inkjet printing apparatus 1000 according to an embodiment may not directly supply the composition 90 for ink from the ink bottle BO to the inkjet head 120 disposed in the spray area DA, but may transfer the composition 90 for ink to the inkjet head 120 through the circulation area CA and the injection area IA. Accordingly, by controlling a temperature of the composition 90 for ink positioned in each area of the inkjet printing apparatus 1000 as will be described in more detail below, the viscosity of the composition 90 for ink may be adjusted to control the precipitation speed of the bipolar elements 95. Therefore, a quality of the composition 90 for ink sprayed from the inkjet head 120 may be adjusted.

Hereinafter, the ink providing unit for supplying the composition 90 for ink to the print head unit 100 will be described in more detail with reference to FIG. 2, in conjunction with FIGS. 1 and 3.

As described above, the inkjet printing apparatus 1000 may include the ink providing unit for providing the composition 90 for ink to the print head unit 100. The ink providing unit may include the ink circulation unit 200 connected to the print head unit 100 through the first connection tube IL1 and a second connection tube IL2, and the ink injection unit 300 connected to the ink circulation unit 200 through a third connection tube IL3. The ink providing unit may further include the ink preparation unit 400 connected to the ink injection unit 300 through a fifth connection tube IL5. The ink preparation unit 400 may store the composition 90 for ink supplied to the ink injection unit 300 before the printing process is performed using the inkjet printing apparatus 1000.

The ink circulation unit 200 may be disposed in the circulation area CA. The ink circulation unit 200 may be disposed in the circulation area CA to serve the supply of the composition 90 for ink to the print head unit 100. In addition, the ink circulation unit 200 may also serve to receive a remaining amount of the composition 90 for ink that is not sprayed through the nozzles 125 from among the composition 90 for ink supplied to the print head unit 100. In other words, the ink circulation unit 200 may serve to supply the composition 90 for ink to the print head unit 100, or may receive the composition 90 for ink from the print head unit 100 to circulate the composition 90 for ink.

The ink circulation unit 200 may be connected to the print head unit 100 through the first and second connection tubes IL1 and IL2. In more detail, the ink circulation unit 200 may supply the composition 90 for ink to the print head unit 100 through the first connection tube IL1, and may receive the composition 90 for ink from the print head unit 100 through the second connection tube IL2. A flow rate of the composition 90 for ink supplied from the ink circulation unit 200 to the print head unit 100 may be adjusted through a separate valve provided on the first connection tube IL1. Similarly, a flow rate of the composition 90 for ink supplied from the print head unit 100 to the ink circulation unit 200 may be adjusted by a separate valve provided on the second connection tube IL2, and a pressure pump 250 described in more detail below. As the composition 90 for ink circulates through the ink circulation unit 200, a variation in the number of bipolar elements 95 included in the composition 90 for ink discharged from the inkjet head 120 may be reduced or minimized.

A position of the ink circulation unit 200 is not necessarily limited, as long as the ink circulation unit 200 is connected to the print head unit 100 to supply the composition 90 for ink to the print head unit 100. The ink circulation unit 200 may be provided in the inkjet printing apparatus 1000, but the position and/or shape thereof is not particularly limited.

The ink circulation unit 200 may include a first ink storage unit (e.g., a first ink storage or a first ink storage tank) 220, a second ink storage unit (e.g., a second ink storage or a second ink storage tank) 210, and the pressure pump 250. In the ink circulation unit 200, the first ink storage unit 220 is connected to the print head unit 100 through the first connection tube IL1. The first ink storage unit 220 and the second ink storage unit 210 are connected to each other through a fourth connection tube IL4. The second ink storage unit 210 is connected to the print head unit 100 through the second connection tube IL2, and the pressure pump 250 is disposed between the second ink storage unit 210 and the print head unit 100. The above-described structure may form one ink circulation system. In other words, the above-described components may form a single ink circulation system.

The first ink storage unit 220 may serve to temporarily store or accommodate the composition 90 for ink before supplying the composition 90 for ink to the print head unit 100, and may transfer the composition 90 for ink to the print head unit 100. The first ink storage unit 220 may transfer the composition 90 for ink supplied from the second ink storage unit 210 through the fourth connection tube IL4 to the print head unit 100 through the first connection tube IL1.

The shape and structure of the first ink storage unit 220 is not particularly limited, so long as the first ink storage unit 220 is capable of storing or accommodating the composition 90 for ink. Although the drawings illustrate that the first ink storage unit 220 has a rectangular parallelepiped shape, the first ink storage unit 220 may have a suitable shape that forms a space (e.g., a predetermined space) to store or accommodate the composition 90 for ink, for example, such as a cylinder shape or a sphere shape.

The second ink storage unit 210 may store and/or accommodate the composition 90 for ink before supplying the composition 90 for ink to the first ink storage unit 220, and may disperse the bipolar elements 95 in the solvent 91. The second ink storage unit 210 may serve to supply the composition 90 for ink having a constant or substantially constant degree of dispersion to the first ink storage unit 220, by dispersing the bipolar elements 95 included in the composition 90 for ink supplied from the ink injection unit 300 through the third connection tube IL3 and the composition 90 for ink supplied from the print head unit 100 through the second connection tube IL2, so as not to be precipitated in the composition 90 for ink. The second ink storage unit 210 may serve as a buffer storage unit in which a portion of the composition 90 for ink circulated in the ink circulation system is stored.

The second ink storage unit 210 may include a stirrer ST. The stirrer ST may disperse the bipolar elements 95 in the composition 90 for ink. The composition 90 for ink supplied to the second ink storage unit 210 may maintain or substantially maintain a state in which the bipolar elements 95 are dispersed without being sedimented as the stirrer ST rotates. In other words, the stirrer ST of the second ink storage unit 210 may prevent or substantially prevent a difference in the number of bipolar elements 95 in the composition 90 for ink discharged through the inkjet head 120, which may be caused depending on a process point of time that occurs due to the bipolar elements 95 sinking to a bottom of the second ink storage unit 210.

The shape and structure of the second ink storage unit 210 is not particularly limited, so long as the second ink storage unit 210 is capable of storing or accommodating the composition 90 for ink. Although the drawings illustrate that the second ink storage unit 210 has a rectangular parallelepiped shape, the second ink storage unit 210 may have any suitable shape that forms a space (e.g., a predetermined space) to store or accommodate the composition 90 for ink, for example, such as a cylinder shape or a sphere shape.

The pressure pump 250 may be disposed between the print head unit 100 and the second ink storage unit 210. The composition 90 for ink remaining after being sprayed from the print head unit 100 may be supplied to the second ink storage unit 210 through the pressure pump 250. The pressure pump 250 may be a pump that transmits power to a fluid, so that the composition 90 for ink in the ink circulation system may be circulated.

In some embodiments, the ink circulation unit 200 may further include a flow meter and a compressor disposed between the pressure pump 250 and the second ink storage unit 210. The flow meter may measure a flow rate of the composition 90 for ink supplied to the second ink storage unit 210. The pressure pump 250 may adjust the flow rate of the composition 90 for ink supplied to the second ink storage unit 210 according to the flow rate of the composition 90 for ink measured from the flow meter. The compressor may adjust a pressure in the second ink storage unit 210. The compressor may remove gas from the second ink storage unit 210, so that the inside of the second ink storage unit 210 is in a vacuum state, or may introduce an external inert gas into the second ink storage unit 210, so that the inside of the second ink storage unit 210 has a desired pressure (e.g., a predetermined pressure). However, the present disclosure is not limited thereto, and the flow meter and the compressor of the ink circulation unit 200 may be omitted as needed or desired.

The ink injection unit 300 may be disposed in the injection area IA. The ink injection unit 300 may serve to convert the composition 90 for ink stored in the ink bottle BO in a high viscosity state into the composition 90 for ink in a low viscosity state, to supply the converted composition 90 for ink to the ink circulation unit 200. For example, when the ink bottle BO is provided to the inkjet printing apparatus 1000, the ink injection unit 300 may supply the composition 90 for ink in a high viscosity state, for example, such as in a solid state, or the composition 90 for ink in a liquid or colloid state with high viscosity, to the ink circulation unit 200 as the composition 90 for ink in a liquid or colloid state with low viscosity. In other words, the ink injection unit 300 may be a space in which the composition 90 for ink in the solid state is melted to change the state to the liquid or colloid state, or the viscosity of the composition 90 for ink in the liquid or colloid state is reduced. The ink injection unit 300 may transfer the composition 90 for ink supplied from the ink preparation unit 400 through the fifth connection tube IL5 to the ink circulation unit 200, for example, to the second ink storage unit 210, through the third connection tube IL3.

The shape and structure of the ink injection unit 300 are not particularly limited, so long as the ink injection unit 300 is capable of changing the state of the composition 90 for ink by storing and accommodating the composition 90 for ink. Although the ink injection unit 300 is illustrated in the drawings as having a rectangular parallelepiped shape, the ink injection unit 300 may have any suitable shape capable of accommodating the composition 90 for ink and changing the state thereof, for example, such as a cylinder shape or a sphere shape. The ink injection unit 300 may further include a separate device for changing the viscosity of the composition 90 for ink. The separate device for changing the viscosity of the composition 90 for ink is not particularly limited, as long as it is capable of transferring thermal energy to the composition 90 for ink, while not damaging the bipolar elements 95.

The ink preparation unit 400 may be disposed in the preparation area PA. The ink preparation unit 400 may serve to provide the ink bottle BO in which the pre-prepared composition 90 for ink is stored to the inkjet printing apparatus 1000, or to store the ink bottle BO. The ink preparation unit 400 may supply the composition 90 for ink stored in the ink bottle BO to the ink injection unit 300 through the fifth connection tube IL5.

The shape and structure of the ink preparation unit 400 are not particularly limited, so long as the ink preparation unit 400 is capable of storing the ink bottle BO. Although the ink preparation unit 400 is illustrated in the drawings as having a rectangular parallelepiped shape, the ink preparation unit 400 may have any suitable shape that forms a space (e.g., a predetermined space) to store or accommodate the ink bottle BO, for example, such as a cylinder shape or a sphere shape.

The inkjet printing apparatus 1000 according to an embodiment may include the temperature adjusting unit 500 that may control a temperature for each area of the inkjet printing apparatus 1000. The temperature adjusting unit 500 may control the viscosity of the composition 90 for ink positioned in each area to be different, by adjusting the temperature of the composition 90 for ink as described above, and may provide the composition 90 for ink that satisfies optimum or improved conditions in each process (area).

The temperature adjusting unit 500 according to an embodiment includes a first temperature adjusting unit (e.g., a first temperature adjustor, a first temperature adjusting part, or a first temperature adjusting device) 510, a second temperature adjusting unit (e.g., a second temperature adjustor, a second temperature adjusting part, or a second temperature adjusting device) 520, and a third temperature adjusting unit (e.g., a third temperature adjustor, a third temperature adjusting part, or a third temperature adjusting device) 530. The temperature adjusting unit 500 may further include a fourth temperature adjusting unit (e.g., a fourth temperature adjustor, a fourth temperature adjusting part, or a fourth temperature adjusting device) 540.

The first temperature adjusting unit 510 may be disposed in the spray area DA. The first temperature adjusting unit 510 may adjust the temperature of the composition 90 for ink in the spray area DA, by adjusting a temperature of the spray area DA. In an embodiment, the first temperature adjusting unit 510 may serve to adjust the temperature of the composition 90 for ink in the print head unit 100, by adjusting a temperature of the print head unit 100 disposed in the spray area DA.

The second temperature adjusting unit 520 may be disposed in the circulation area CA. The second temperature adjusting unit 520 may adjust the temperature of the composition 90 for ink in the circulation area CA, by adjusting a temperature of the circulation area CA. In an embodiment, the second temperature adjusting unit 520 may serve to adjust the temperature of the composition 90 for ink in the first ink storage unit 220, by adjusting a temperature of the first ink storage unit 220 disposed in the circulation area CA.

The third temperature adjusting unit 530 may be disposed in the injection area IA. The third temperature adjusting unit 530 may adjust the temperature of the composition 90 for ink in the injection area IA, by adjusting a temperature of the injection area IA. In an embodiment, the third temperature adjusting unit 530 may serve to adjust the temperature of the composition 90 for ink in the ink injection unit 300, by adjusting a temperature of the ink injection unit 300 disposed in the injection area IA.

The fourth temperature adjusting unit 540 may be disposed in the preparation area PA. The fourth temperature adjusting unit 540 may adjust the temperature of the composition 90 for ink in the preparation area PA, by adjusting a temperature of the preparation area PA. In an embodiment, the fourth temperature adjusting unit 540 may serve to adjust the temperature of the composition 90 for ink in the ink preparation unit 400, for example, such as the composition 90 for ink stored in the ink bottle BO, and provided to the inkjet printing apparatus 1000, by adjusting a temperature of the ink preparation unit 400 disposed in the preparation area PA.

Figure 4:
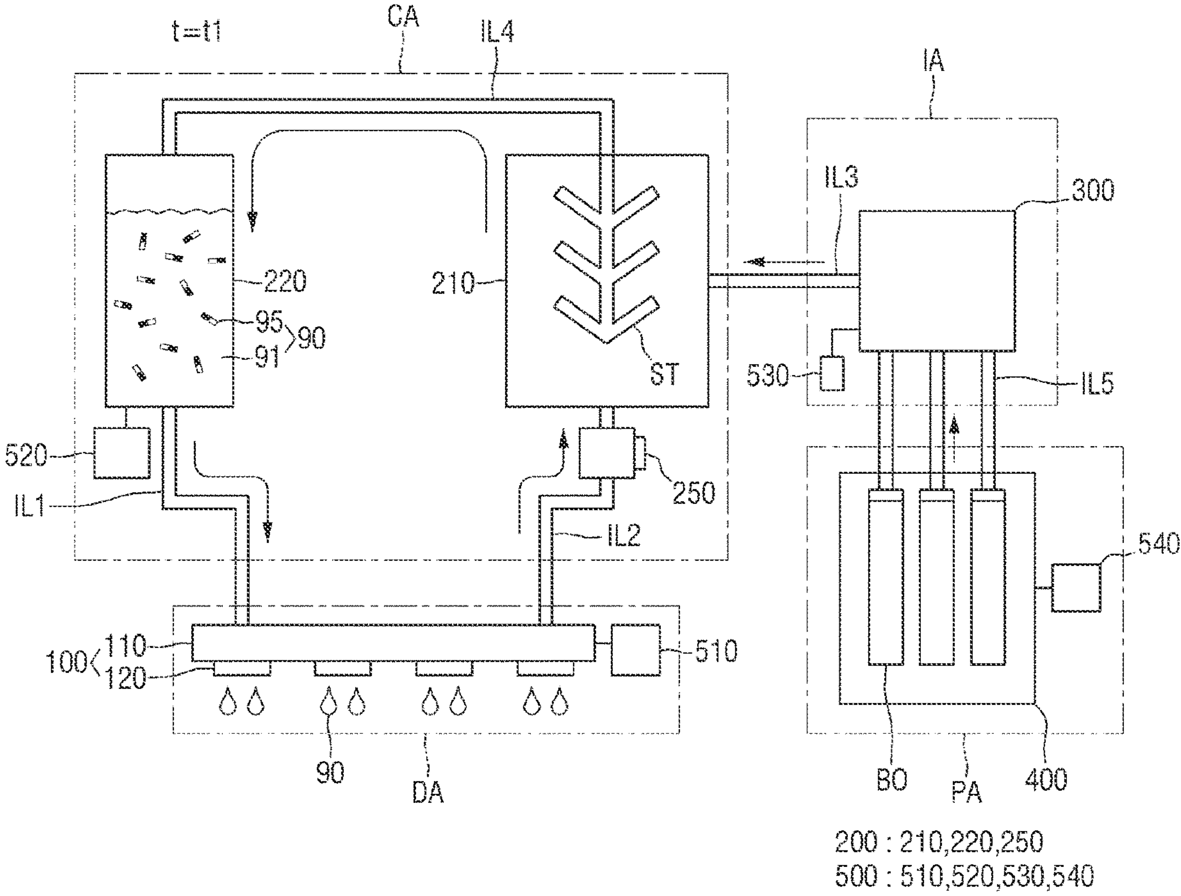
FIG. 4 is a cross-sectional view of a point in time when a printing process is performed using an inkjet printing apparatus.
Figure 5:
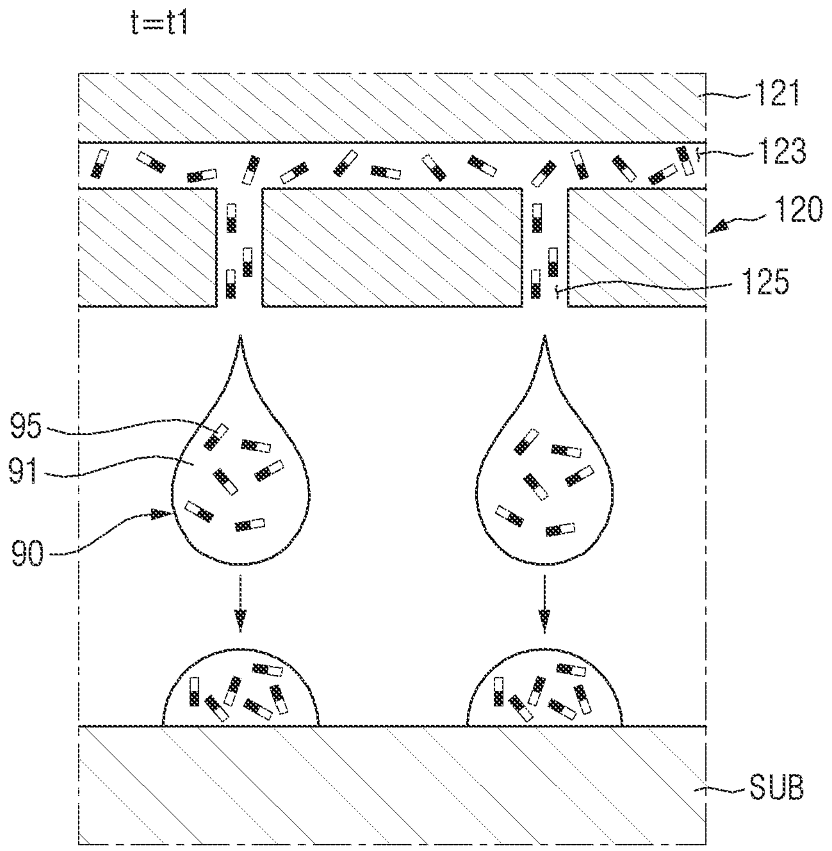
FIG. 5 is a partial cross-sectional view of the inkjet printing apparatus at the point in time illustrated in FIG. 4.
Figure 6:
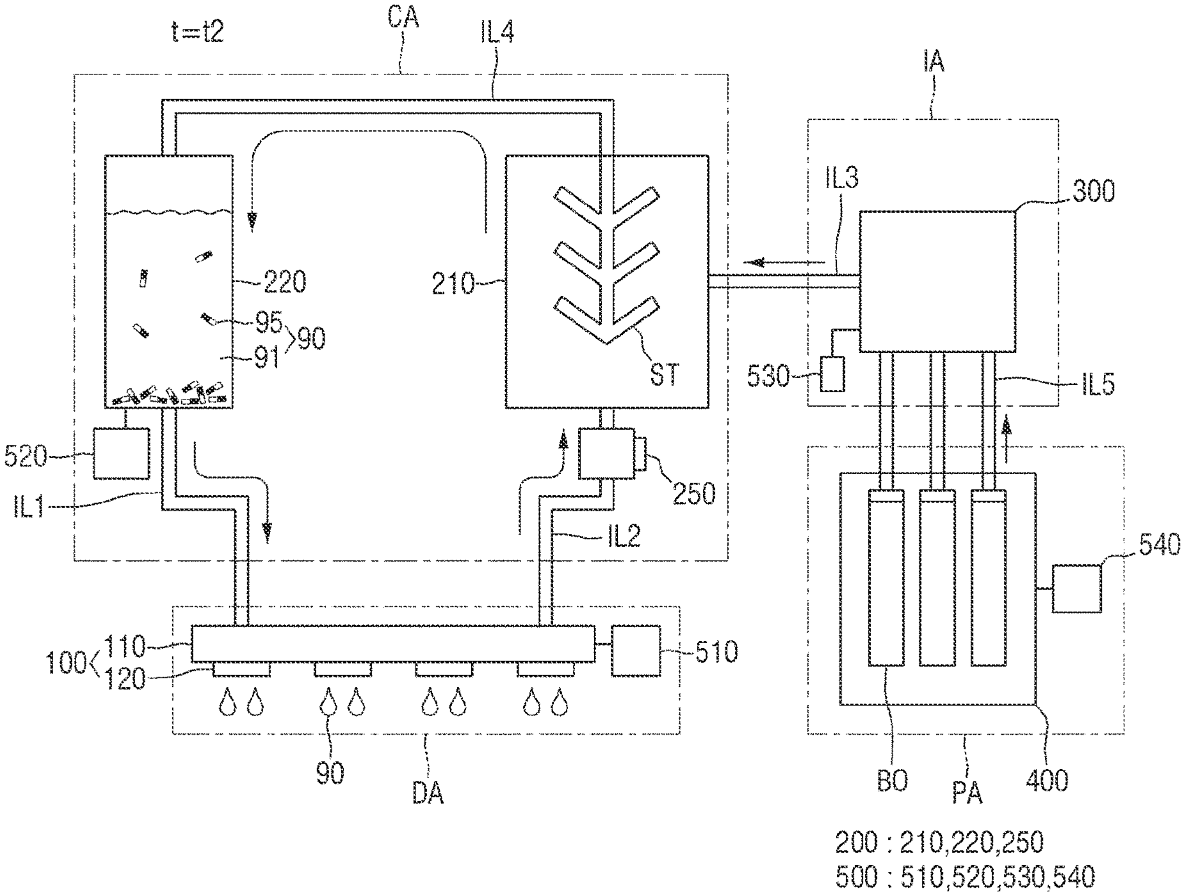
FIG. 6 is a cross-sectional view of another point in time when the printing process is performed using the inkjet printing apparatus.
Figure 7:
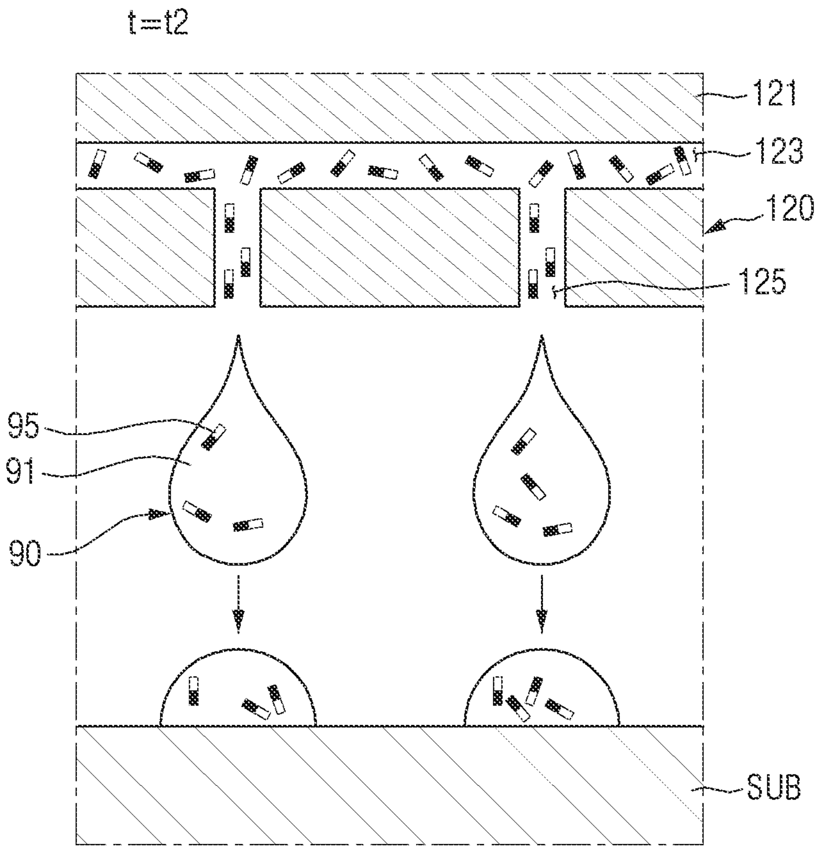
FIG. 7 is a partial cross-sectional view of the inkjet printing apparatus at the other point in time illustrated in FIG. 6.

FIG. 4 is a cross-sectional view of a point in time when a printing process is performed using an inkjet printing apparatus. FIG. 5 is a partial cross-sectional view of the inkjet printing apparatus at the point in time illustrated in FIG. 4. FIG. 6 is a cross-sectional view of another point in time when the printing process is performed using the inkjet printing apparatus. FIG. 7 is a partial cross-sectional view of the inkjet printing apparatus at the other point in time illustrated in FIG. 6.

FIGS. 4 and 5 are diagrams illustrating a process of spraying the composition 90 for ink on the target substrate SUB using the inkjet printing apparatus at a first point of time (e.g., t=t1) when the temperature is not adjusted by the temperature adjusting unit 500. FIGS. 6 and 7 are diagrams illustrating a process of spraying the composition 90 for ink on the target substrate SUB using the inkjet printing apparatus at a second point of time (e.g., t=t2) different from the first point of time (t=t1) when the temperature is not adjusted by the temperature adjusting unit 500. The first point of time (t=t1) may be an initial point of time at which the printing process is started, and the second point of time (t=t2) may be a point of time after a certain time (e.g., a predetermined time) has elapsed from the point of time at which the printing process is started. In other words, the second point of time (t=t2) may be a point of time at which the composition 90 for ink is completely sprayed on some of the plurality of areas of the target substrate SUB using the print head unit 100.

Although FIGS. 4 through 7 illustrate that the composition 90 for ink including the solvent 91 and the plurality of bipolar elements 95 dispersed in the solvent 91 is positioned (e.g., stored and/or accommodated) in only the first ink storage unit 220 of the ink circulation unit 200 and the inkjet head 120 of the print head unit 100, the composition 90 for ink may also be positioned (e.g., stored and/or accommodated) in other members of the inkjet printing apparatus 1000 during the printing process.

Referring first to FIGS. 4 and 5, at the first point of time (t=t1), which is the initial time point of the printing process, the composition 90 for ink in the first ink storage unit 220 of the ink circulation unit 200 may be in a state in which the bipolar elements 95 are uniformly or substantially uniformly dispersed in the composition 90 for ink. Therefore, at the first point of time (t=t1), the inkjet head 120 may receive the composition 90 for ink in the first ink storage unit 220, in which the bipolar elements 95 are uniformly or substantially uniformly dispersed, from the first ink storage unit 220, and may spray the composition 90 for ink onto the target substrate SUB. Therefore, the number of bipolar elements 95 included in the composition 90 for ink discharged from each nozzle 125 of the inkjet head 120 at the first point of time (t=t1) may be included in a threshold number region (e.g., a predetermined or preset threshold number region). In addition, the number of bipolar elements 95 included in the composition 90 for ink discharged from each nozzle 125 is constantly or substantially constantly maintained, so that a variation of the number of bipolar elements 95 discharged by each nozzle 125 may be small.

As the second ink storage unit 210 includes the stirrer ST, a minute vibration may occur due to driving of the stirrer ST when the second ink storage unit 210 is disposed adjacent to the print head unit 100. In this case, an impact accuracy of the composition 90 for ink on the target substrate SUB through the print head unit 100 may be reduced due to the vibration of the stirrer ST. Therefore, the present disclosure is not limited thereto, and a print quality of the printing process may be improved, by transferring the composition 90 for ink through the first ink storage unit 220 that does not include the stirrer ST, instead of directly supplying the composition 90 for ink from the second ink storage unit 210 to the print head unit 100 by disposing the second ink storage unit 210 including the stirrer ST adjacent to the print head unit 100. However, as the first ink storage unit 220 does not include the stirrer ST, the composition 90 for ink in the first ink storage unit 220 may be precipitated or sedimented as illustrated in FIG. 6 over time, as described above.

Referring to FIGS. 6 and 7, at the second point of time (t=t2) at which the printing process is in progress and the process time has elapsed, gravity may be applied to the composition 90 for ink in the first ink storage unit 220 of the ink circulation unit 200. Therefore, the bipolar elements 95 having a larger specific gravity than that of the solvent 91 included in the composition 90 for ink in the first ink storage unit 220 that does not include the stirrer ST may be precipitated or sedimented in a lower portion of the first ink storage unit 220. Therefore, an area in which the bipolar elements 95 are concentrated at a lower portion, such that only the solvent 91 exists at an upper portion, may occur in the composition 90 for ink in the first ink storage unit 220, so that the composition 90 for ink may have a non-uniform degree of dispersion. In more detail, when the bipolar elements 95 are precipitated in the lower portion of the first ink storage unit 220 and aggregated with each other, the bipolar elements 95 may not move to the first connection tube IL1 that connects the first ink storage unit 220 and the print head unit 100 to each other. Therefore, the specific gravity of the bipolar elements 95 transferred from the first ink storage unit 220 to the inkjet head 120 of the print head unit 100 may be reduced.

Thus, at the second point of time (t=t2), the inkjet head 120 may receive the composition 90 for ink in the first ink storage unit 220 in which the bipolar elements 95 are non-uniformly dispersed from the first ink storage unit 220, and may spray the composition 90 for ink onto the target substrate SUB. As a result, the number of bipolar elements 95 included in the composition 90 for ink discharged from each nozzle 125 of the inkjet head 120 at the second point of time (t=t2) may not be included in the threshold number region (e.g., the predetermined or preset threshold number region). Therefore, the number of bipolar elements 95 included in the composition 90 for ink discharged from each nozzle 125 may not be constantly or substantially constantly maintained, so that a variation in the number of bipolar elements 95 discharged by each nozzle 125 may increase.

Accordingly, in order to maintain or substantially maintain the degree of dispersion of the bipolar elements 95 while storing and/or accommodating the composition 90 for ink in the first ink storage unit 220 that does not include the stirrer ST, the viscosity of the composition 90 for ink may be adjusted to reduce a precipitation speed of the bipolar elements 95. The inkjet printing apparatus 1000 according to an embodiment may include the temperature adjusting unit 500 disposed in each area to control the temperature for each area, thereby, adjusting the viscosity of the composition 90 for ink by adjusting the temperature of the composition 90 for ink in each area.

Hereinafter, a method for printing the composition 90 for ink including the bipolar elements 95 by controlling the temperature for each area of the inkjet printing apparatus 1000 according to an embodiment will be described in more detail with reference to FIGS. 1 and 8.

Figure 8:
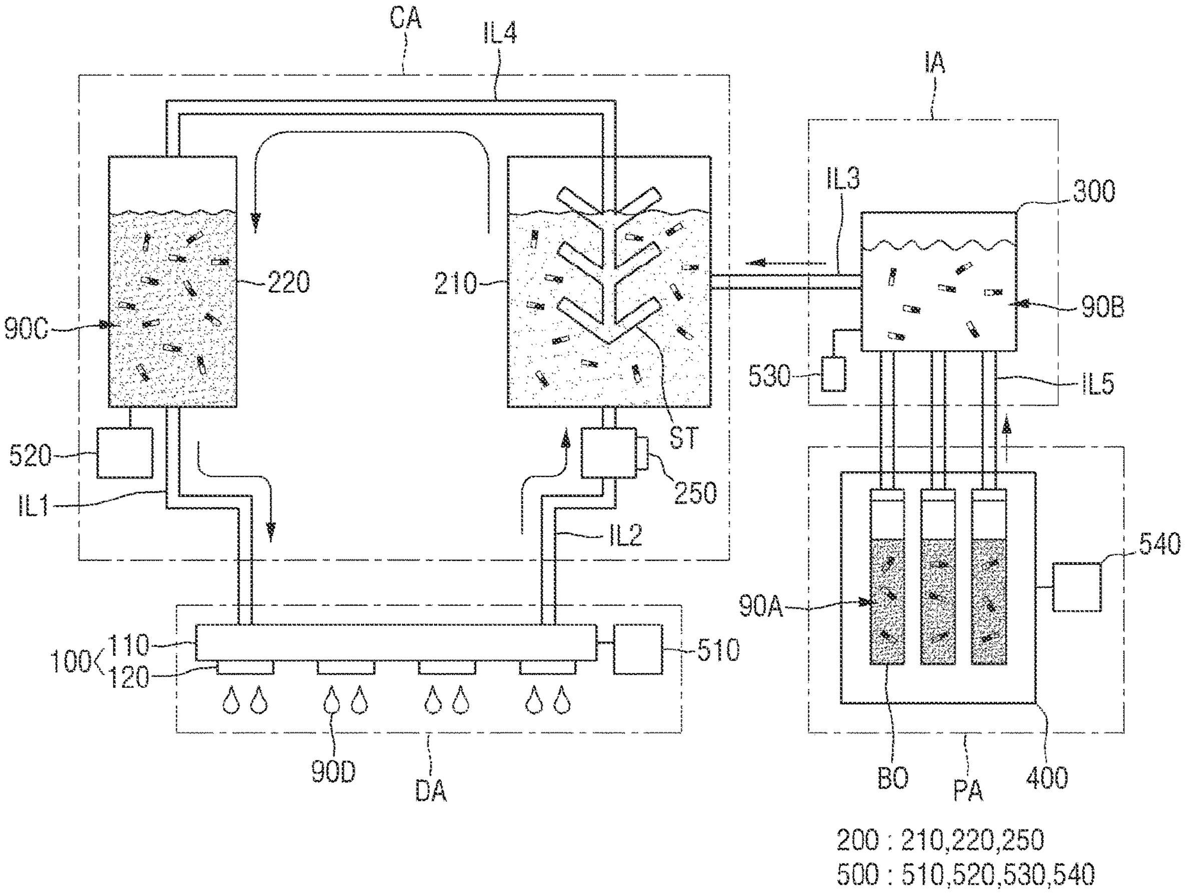
FIG. 8 is a partial side view illustrating a process of spraying a composition for ink using the inkjet printing apparatus according to an embodiment.
Figure 9:
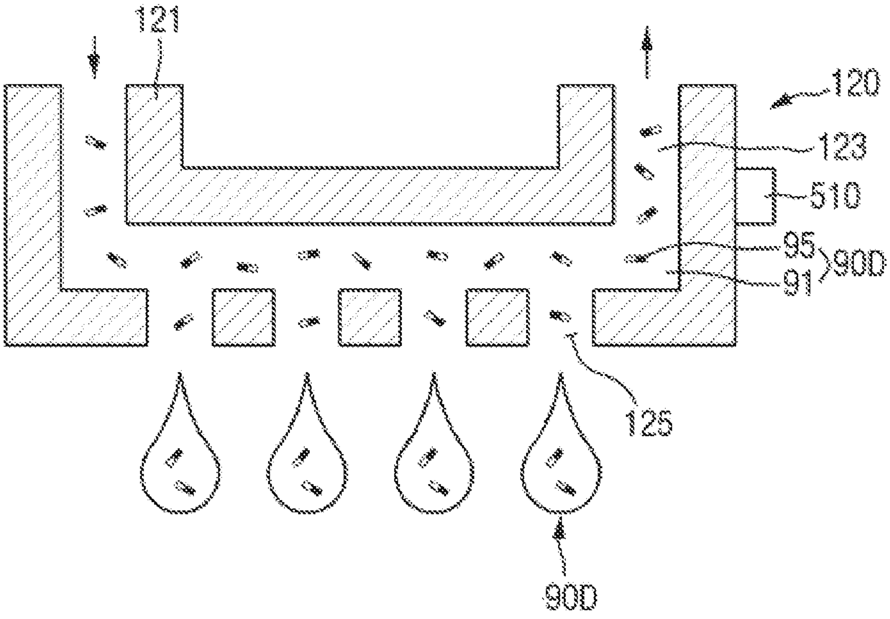
FIG. 9 is an enlarged cross-sectional view of an inkjet head illustrating a process of spraying a composition for ink.

FIG. 8 is a partial side view illustrating a process of spraying a composition for ink using the inkjet printing apparatus according to an embodiment. FIG. 9 is an enlarged cross-sectional view of an inkjet head illustrating a process of spraying a composition for ink.

Referring to FIGS. 1 and 8, the inkjet printing apparatus 1000 according to an embodiment may control the temperature for each of the areas PA, IA, CA, and DA by using the temperature adjusting unit 500, and may spray the composition 90 for ink.

First, the ink bottle BO may be provided to the ink preparation unit 400 disposed in the preparation area PA. The ink bottle BO, in which the pre-prepared composition 90 for ink is stored, may be provided to the inkjet printing apparatus 1000. The ink bottle BO is not particularly limited, but may be an ink cartridge, an ink vessel, or the like in some embodiments. The composition 90 for ink provided to the inkjet printing apparatus 1000 may be provided by being stored (e.g., kept) in the ink bottle BO in a state with high viscosity, for example, such as in a solid state or a liquid or colloid state with high viscosity. However, the composition 90 for ink is not limited thereto, and may also be provided to the inkjet printing apparatus 1000 in a liquid or colloid state, and may be stored in a solid state or in a liquid or colloid state with high viscosity in the ink preparation unit 400 by a temperature adjustment of the fourth temperature adjusting unit 540.

Viscosity of a composition 90A for ink (hereinafter, referred to as a first composition for ink) in the ink preparation unit 400 disposed in the preparation area PA may be high. For example, the first composition 90A for ink may be in a solid state or a liquid or colloid state with high viscosity.

In order to not precipitate the bipolar elements 95 in the composition 90 for ink stored in the ink bottle BO provided in the ink preparation unit 400, the fourth temperature adjusting unit 540 may control the temperature of the ink preparation unit 400 to maintain or substantially maintain high viscosity of the first composition 90A for ink. Therefore, before the composition 90 for ink is supplied to the ink injection unit 300, the first composition 90A for ink may be stored in the ink preparation unit 400 while maintaining or substantially maintaining an initial dispersion state of the bipolar elements 95 included in the first composition 90A for ink.

In an embodiment, when the first composition 90A for ink is in a solid state, a precipitation speed of the bipolar elements 95 in the first composition 90A for ink may be zero. Therefore, when the first composition 90A for ink positioned in the ink preparation unit 400 in the preparation area PA is in the solid state, the degree of dispersion of the bipolar elements 95 in the first composition 90A for ink may be constantly or substantially constantly maintained, even while the printing process is performed. However, the present disclosure is not limited thereto, and in some other embodiments, the first composition 90A for ink may be in a liquid or colloid state with high viscosity. Even in this case, because the first composition 90A for ink has a lower precipitation speed of the bipolar elements 95 compared to a case in which the first composition 90A for ink is in a liquid or colloid state with low viscosity, a retention time of the initial degree of dispersion of the bipolar elements 95 in the first composition 90A for ink may increase.

The fourth temperature adjusting unit 540 may adjust a temperature in the preparation area PA, so that the temperature of the first composition 90A for ink in the preparation area PA is included in a first reference temperature region RT1. In more detail, the fourth temperature adjusting unit 540 may adjust the temperature of the first composition 90A for ink to be included in the first reference temperature region RT1, by controlling the temperature of the ink preparation unit 400 disposed in the preparation area PA to be included in the first reference temperature region RT1. The first reference temperature region RT1 may include a range below a melting point (e.g., a melting point temperature) or a freezing point of the composition 90 for ink, so that the composition 90 for ink is maintained or substantially maintained in the solid state or the liquid or colloid state with high viscosity. For example, the melting point of the composition 90 for ink may have a range of 3° C. or more and 20° C. or less, but is not limited thereto. For example, in an embodiment in which the melting point of the composition 90 for ink is 10° C., the first reference temperature region RT1 may have a range of 0° C. to 10° C., for example, such as 3° C. to 10° C. However, the first reference temperature region RT1 is not limited thereto, and may be variously modified within a range having a temperature range below the melting point of the composition 90 for ink.

By adjusting the temperature of the ink preparation unit 400 disposed in the preparation area PA to be included in the first reference temperature region RT1 lower than the melting point (or the freezing point and the melting point temperature) of the composition 90 for ink using the fourth temperature adjusting unit 540, the first composition 90A for ink in the ink preparation unit 400 may be stored in a solid state or in a liquid or colloid state with high viscosity. Therefore, by controlling the degree of dispersion of the composition 90 for ink to be constant or substantially constant even in the process of preparing the composition 90 for ink, it may be possible to provide the composition 90 for ink having improved quality (e.g., excellent quality). In an embodiment, in order to maintain or substantially maintain a dispersion state of the bipolar elements 95 included in the first composition 90A for ink to be the same as the initial dispersion state, the first composition 90A for ink in the ink preparation unit 400 may be stored in a solid state. However, the present disclosure is not limited thereto.

The fourth temperature adjusting unit 540 may include a member capable of adjusting the temperature of the ink preparation unit 400. The configuration of the fourth temperature adjusting unit 540 is not particularly limited, as long as it may adjust the temperature inside the ink preparation unit 400 disposed in the preparation area PA. For example, the fourth temperature adjusting unit 540 may include a cooling device disposed in the preparation area PA and provided in an area adjacent to the ink preparation unit 400, to indirectly adjust the temperature of the ink preparation unit 400 by adjusting a temperature of the area adjacent to the ink preparation unit 400. In another example, the fourth temperature adjusting unit 540 may include a cooling unit (e.g., a cooler) provided in the ink preparation unit 400, to directly adjust the temperature in the ink preparation unit 400.

Next, the composition 90 for ink may be supplied from the ink preparation unit 400 to the injection area IA. In more detail, the composition 90 for ink may be supplied from the ink preparation unit 400 to the ink injection unit 300 disposed in the injection area IA. As described above, the first composition 90A for ink in the ink preparation unit 400 may be supplied from the ink preparation unit 400 to the ink injection unit 300 through the fifth connecting tube IL5.

A composition 90B for ink (hereinafter, a second composition for ink) in the ink injection unit 300 disposed in the injection area IA may be in a liquid or colloid state. The ink injection unit 300 may serve to change or adjust the state or viscosity of the first composition 90A for ink, which is in the solid state or the liquid or colloid state with high viscosity, to the second composition 90B for ink, which is in the liquid or colloid state with low viscosity, in order to transfer the second composition 90B for ink to the ink circulation unit 200 as described above. In order to facilitate movement of the composition 90 for ink including the bipolar elements 95 in the inkjet printing apparatus 1000, the ink injection unit 300 may adjust the viscosity, so that the first composition 90A for ink with high viscosity becomes the second composition 90B for with low viscosity, by increasing the temperature of the composition 90 for ink using the third temperature adjusting unit 530.

The third temperature adjusting unit 530 may adjust a temperature in the injection area IA, so that the temperature of the second composition 90B for ink in the injection area IA is included in a second reference temperature region RT2. In more detail, the third temperature adjusting unit 530 may adjust the temperature of the second composition 90B for ink to be included in the second reference temperature region RT2, by controlling the temperature of the ink injection unit 300 disposed in the injection area IA to be included in the second reference temperature region RT2. The second reference temperature region RT2 may have a temperature range greater than or equal to the melting point of the composition 90 for ink.

In an embodiment, when the first composition 90A for ink is in a solid state, the second reference temperature region RT2 may have a temperature range greater than or equal to the melting point, so that the first composition 90A for ink is completely dissolved, and the composition 90 for ink exists in a liquid state. In some other embodiments, when the first composition 90A for ink is in a liquid or colloid state with high viscosity, the second reference temperature region RT2 may include a higher temperature range than that of the first reference temperature region RT1, so that the viscosity of the second composition 90B for ink is lower than that of the first composition 90A for ink (e.g., RT2>RT1). For example, in the embodiment described above in which the melting point of the composition 90 for ink is 10° C., the second reference temperature region RT2 may have a range of 30° C. to 80° C., for example, such as 40° C. to 60° C. However, the temperature range of the second reference temperature region RT2 is not limited thereto.

By adjusting the temperature of the ink injection unit 300 disposed in the injection area IA to be included in the second reference temperature region RT2 higher than the melting point (or the freezing point and the melting point temperature) of the composition 90 for ink using the third temperature adjusting unit 530, the second composition 90B for ink in the ink injection unit 300 may be supplied to the second ink storage unit 210 of the ink circulation unit 200 in a liquid state with low viscosity.

The third temperature adjusting unit 530 may include a member for reducing the viscosity of the composition 90 for ink by adjusting the temperature of the ink injection unit 300. The configuration of the third temperature adjusting unit 530 is not particularly limited, as long as it may adjust the temperature inside the ink injection unit 300 disposed in the injection area IA. For example, the third temperature adjusting unit 530 may include a heating device or a heater disposed in the injection area IA and provided in an area adjacent to the ink injection unit 300, to indirectly adjust the temperature of the ink injection unit 300, by adjusting a temperature of the area adjacent to the ink injection unit 300. As another example, the third temperature adjusting unit 530 may include a heating unit (e.g., a heating device or a heater) provided in the ink injection unit 300, to directly adjust the temperature in the ink injection unit 300.

Next, the composition 90 for ink may be supplied from the ink injection unit 300 to the circulation area CA. In more detail, the composition 90 for ink may be supplied from the ink injection unit 300 to the second ink storage unit 210 disposed in the circulation area CA. As described above, the second composition 90B for ink in the ink injection unit 300 may be supplied from the ink injection unit 300 to the second ink storage unit 210 through the third connecting tube IL3.

The composition 90 for ink located in the second ink storage unit 210 in the circulation area CA may maintain or substantially maintain a state in which the bipolar elements 95 are dispersed without being sedimented by using the stirrer ST as described above.

Next, the composition 90 for ink may be supplied from the second ink storage unit 210 to the first ink storage unit 220 through the fourth connecting tube IL4 in the circulation area CA. The first ink storage unit 220 is a space for temporarily storing and/or accommodating the composition 90 for ink, to transfer the composition 90 for ink to the print head unit 100, and as described above, the number of bipolar elements 95 included in the composition 90 for ink discharged from the inkjet head 120 may be different depending on the degree of dispersion of a composition 90C for ink (hereinafter, referring to as a third composition for ink) in the first ink storage unit 220.

As described above, the first ink storage unit 220 may not include the stirrer ST. Therefore, by increasing the viscosity of the third composition 90C for ink in the first ink storage unit 220, it may be possible to adjust the degree of dispersion of the third composition 90C for ink to be maintained or substantially maintained. For example, by increasing the viscosity of the third composition 90C for ink, the precipitation speed of the bipolar elements 95 in the composition 90 for ink, which is in the liquid or colloid state, may be reduced. For example, when the viscosity of the third composition 90C for ink increases, the precipitation speed of the bipolar elements 95 due to gravity acting on the bipolar elements 95 in the third composition 90C for ink may be reduced. The viscosity of the third composition 90C for ink may be controlled by adjusting a temperature of the third composition 90C for ink.

The second temperature adjusting unit 520 may adjust a temperature in the circulation area CA, so that the temperature of the third composition 90C for ink in the circulation area CA is included in a third reference temperature region RT3. In more detail, the second temperature adjusting unit 520 may adjust the temperature of the third composition 90C for ink to be included in the third reference temperature region RT3, by controlling the temperature of the first ink storage unit 220 disposed in the circulation area CA to be included in the third reference temperature region RT3. In order to increase the viscosity of the composition 90 for ink to maintain or substantially maintain the degree of dispersion of the composition 90 for ink, the third reference temperature region RT3 may have a temperature range higher than that of the first reference temperature region RT1 and lower than that of the second reference temperature region RT2 (e.g., RT1<RT3<RT2). For example, in the embodiment described above in which the melting point of the composition 90 for ink is 10° C., the third reference temperature region RT3 may have a range of 20° C. to 30° C., for example, such as 25° C. to 30° C. However, the temperature range of the third reference temperature region RT3 is not limited thereto.

By adjusting the temperature of the first ink storage unit 220 disposed in the circulation area CA using the second temperature adjusting unit 520, the temperature of the third composition 90C for ink in the first ink storage unit 220 may be maintained or substantially maintained to be higher than the temperature of the first composition 90A for ink, and lower than the temperature of the second composition 90B for ink. Therefore, the third composition 90C for ink may be stored in the first ink storage unit 220 in a liquid or colloid state with increased viscosity when compared to the second composition 90B for ink. Therefore, the inkjet printing apparatus 1000 according to the present embodiment may store the third composition 90C for ink having the improved degree (e.g., the excellent degree) of dispersion in the first ink storage unit 220, and may provide the third composition 90C for ink having the improved degree of dispersion from the first ink storage unit 220 to the print head unit 100. Therefore, despite the elapse of the process time, the number of bipolar elements 95 included per unit volume of the composition 90 for ink may be constantly or substantially constantly maintained, thereby, improving reliability of an inkjet printing process and a quality of the finally manufactured product.

The second temperature adjusting unit 520 may include a member capable of adjusting the temperature of the first ink storage unit 220. The configuration of the second temperature adjusting unit 520 is not particularly limited, as long as it may adjust the temperature inside the first ink storage unit 220 disposed in the circulation area CA. For example, the second temperature adjusting unit 520 may include a heating device or a heater disposed in the circulation area CA and provided in an area adjacent to the first ink storage unit 220, to indirectly adjust the temperature of the first ink storage unit 220 by adjusting a temperature of the area adjacent to the first ink storage unit 220. As another example, the second temperature adjusting unit 520 may include a heating unit (e.g., a heating device or a heater) provided in the first ink storage unit 220, to directly adjust the temperature in the first ink storage unit 220.

Next, referring to FIGS. 8 and 9, the composition 90 for ink may be supplied from the first ink storage unit 220 to the spray area DA. In more detail, the composition 90 for ink may be supplied from the first ink storage unit 220 to the print head unit 100 disposed in the spray area DA. As described above, the third composition 90C for ink in the first ink storage unit 220 may be supplied from the first ink storage unit 220 to the inkjet head 120 of the print head unit 100 through the first connecting tube IL1.

In order to increase a discharging accuracy in which the composition 90D for ink (hereinafter, referred to as a fourth composition for ink) is sprayed from the inkjet head 120 and seated on the target substrate SUB, the fourth composition 90D for ink may have an appropriate viscosity. For example, with respect to a droplet amount and an impact position of the fourth composition 90D for ink sprayed from the inkjet head 120 onto the target substrate SUB, when the viscosity of the fourth composition 90D for ink is too high, the fourth composition 90D for ink may not flow through the second inner tube 123, or it may be difficult for the fourth composition 90D for ink to be sprayed through the nozzle 125.

Therefore, in order to facilitate the movement of the fourth composition 90D for ink through the second inner tube 123 of the inkjet head 120, and to facilitate the spraying of the fourth composition 90D for ink through the nozzle 125, the first temperature adjusting unit 510 may adjust a temperature in the spray area DA, so that a temperature of the fourth composition 90D for ink in the spray area DA is included in a fourth reference temperature region RT4. In more detail, the first temperature adjusting unit 510 may adjust the temperature of the fourth composition 90D for ink to be included in the fourth reference temperature region RT4, by controlling a temperature of the inkjet head 120 disposed in the spray area DA to be included in the fourth reference temperature region RT4. In order to reduce the viscosity of the composition 90 for ink, and in order for the composition 90 for ink to have a desired viscosity (e.g., an optimum viscosity), the fourth reference temperature region RT4 may have a temperature range higher than those of the first and third reference temperature regions RT1 and RT3, and lower than that of the second reference temperature region RT2 (e.g., RT1<RT3<RT4<RT2). For example, in the embodiment described above in which the melting point of the composition 90 for ink is 10° C., the fourth reference temperature region RT4 may have a range of 30° C. to 60° C., for example, such as 30° C. to 50° C. However, the temperature range of the fourth reference temperature region RT4 is not limited thereto.

By adjusting the temperature of the inkjet head 120 disposed in the spray area DA using the first temperature adjusting unit 510, the temperature of the fourth composition 90D for ink in the inkjet head 120 may be maintained or substantially maintained to be higher than the temperature of the first composition 90A for ink and the temperature of the third composition 90C for ink, and lower than the temperature of the second composition 90B for ink. Therefore, the fourth composition 90D for ink may be sprayed onto the target substrate SUB, while flowing inside the inkjet head 120 in a liquid or colloid state having reduced viscosity when compared to the third composition 90C for ink.

The first temperature adjusting unit 510 may include a member capable of adjusting the temperature of the inkjet head 120. The configuration of the first temperature adjusting unit 510 is not particularly limited, as long as it may adjust the temperature inside the inkjet head 120 disposed in the spray area DA. For example, the first temperature adjusting unit 510 may include a heating device or a heater disposed in the spray area DA and provided in an area adjacent to the inkjet head 120, to indirectly adjust the temperature of the inkjet head 120 by adjusting a temperature of the area adjacent to the inkjet head 120. A another example, the first temperature adjusting unit 510 may include a heating unit (e.g., a heating device or a heater) directly provided in the inkjet head 120, to directly adjust the temperature in the fourth composition 90D of ink. Although the first temperature adjusting unit 510 is illustrated in the drawings as being directly attached to an outer surface of the inkjet head 120 to indirectly adjust the temperature of the fourth composition 90D for ink by adjusting the temperature of the inkjet head 120, the present disclosure is not limited thereto, and the first temperature adjusting unit 510 may also be attached to the inside of the second base portion 121 of the inkjet head 120 to directly adjust the temperature of the fourth composition 90D for ink.

The inkjet printing apparatus 1000 according to the present embodiment may include the temperature adjusting unit 500 to adjust the temperature of each area to maintain or substantially maintain the composition 90 for ink positioned within each area at a suitable viscosity (e.g., an optimal viscosity). For example, the inkjet printing apparatus 1000 may adjust the temperature of the inkjet printing apparatus 1000, so that the temperature of the area of the inkjet printing apparatus 1000 satisfies the above-described relationship between the respective reference temperature regions, for example, such as the relationship RT1<RT3<RT4<RT2, in the range of 0° C. to 80° C., for example, such as 3° C. to 60° C. In more detail, the inkjet printing apparatus 1000 according to the present embodiment may control the temperature for each area using the temperature adjusting unit 500, to adjust the viscosity of the composition 90 for ink positioned in each area of the inkjet printing apparatus 1000. By adjusting the viscosity of the composition 90 for ink, the precipitation speed of the bipolar elements 95 dispersed in the solvent 91 may be controlled to maintain or substantially maintain a constant or substantially constant degree of dispersion, or a flow rate of the composition 90 for ink for moving in the inkjet printing apparatus 1000 may be adjusted. Therefore, by adjusting the temperature of the composition 90 for ink from the process of providing the ink bottle BO to the inkjet printing apparatus 1000 to the process of spraying the composition 90 for ink through the inkjet head 120, such that the composition 90 for ink having the viscosity that satisfies a suitable condition (e.g., an optimum condition) for each process is provided, reliability of the inkjet printing process may be improved, and a quality of a display device described in more detail below may be improved.

Figure 10:
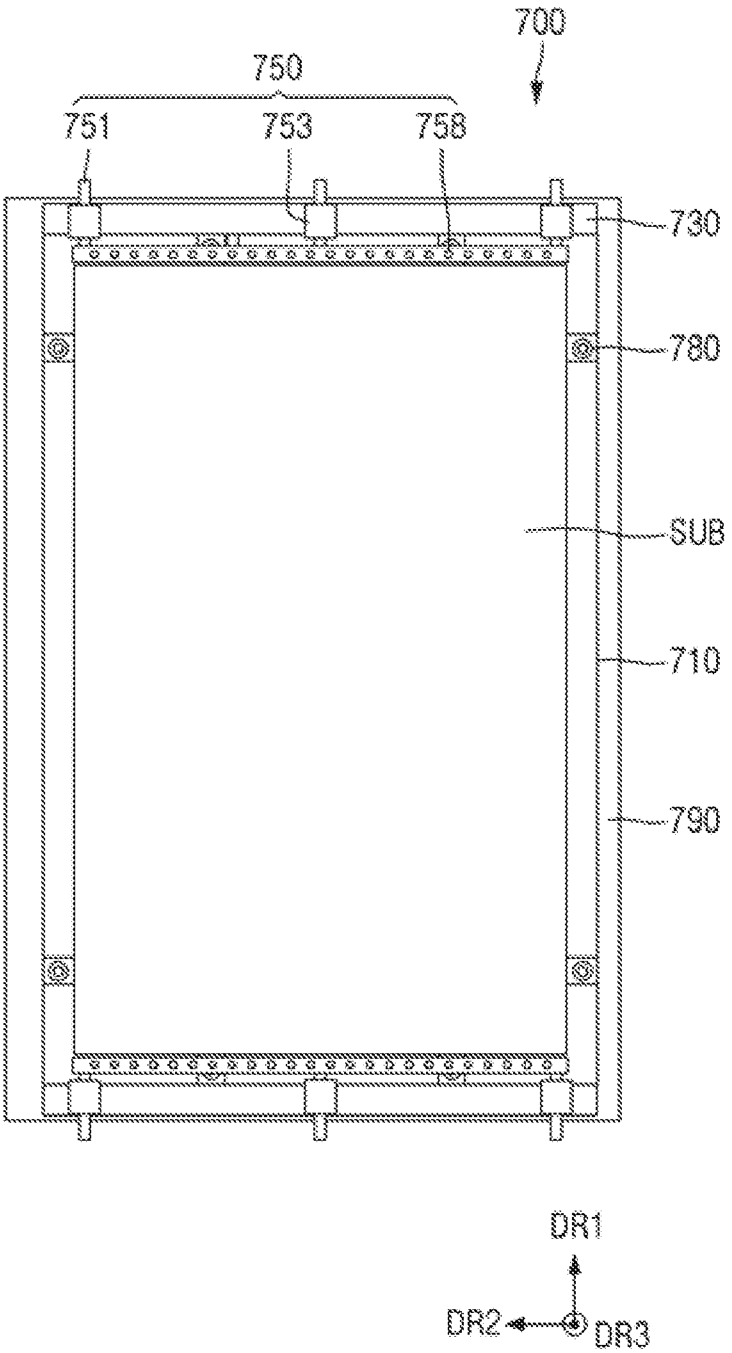
FIG. 10 is a schematic plan view of a stage unit according to an embodiment.

FIG. 10 is a schematic plan view of a stage unit according to an embodiment.

Referring to FIGS. 1 and 10, the stage unit 700 may include the base frame 790, the stage 710, the probe unit 750, and the aligner 780.

The base frame 790 may support the members included in the stage unit 700. For example, the stage 710 and the probe unit 750 may be disposed on the base frame 790.

The base frame 790 may be disposed on the first rail RL1 and the second rail RL2, and may reciprocate while moving in the inkjet printing apparatus 1000 in the second direction DR2. In some embodiments, a moving member (e.g., a predetermined moving member) may be disposed on a lower surface of the base frame 790, and may be fastened to the first and second rails RL1 and RL2 to move the base frame 790 in the second direction DR2.

The stage 710 may be disposed on the base frame 790. The stage 710 may provide a space on which the target substrate SUB is disposed. In addition, the aligner 780 may be disposed on the stage 710.

An overall planar shape of the stage 710 may follow a planar shape of the target substrate SUB. For example, when the target substrate SUB has a rectangular shape in a plan view, the planar shape of the stage 710 may have a rectangular shape as illustrated in the drawings, and when the target substrate SUB has a circular shape in a plan view, the planar shape of the stage 710 may also have a circular shape.

The aligner 780 may be installed on the stage 710 to align the target substrate SUB disposed on the stage 710. The aligner 780 is disposed on each side of the stage 710, and an area surrounded (e.g., around a periphery thereof) by a plurality of aligners 780 may be an area in which the target substrate SUB is disposed. Although two aligners 780 are illustrated in the drawings as being disposed to be spaced apart from each other on each side of the stage 710, such that a total of eight aligners 780 are disposed on the stage 710, the present disclosure is not limited thereto, and the number and arrangement of the aligners 780 may be variously modified depending on the shape or type of the target substrate SUB.

The probe unit 750 may be disposed on the base frame 790. The probe unit 750 may serve to form an electric field on the target substrate SUB that is prepared on the stage 710. The probe unit 750 may extend in the second direction DR2, and the extended length thereof may cover an entire length of the target substrate SUB. The size and shape of the probe unit 750 may be variously modified depending on the target substrate SUB.

The probe unit 750 may include a probe driver 753, a probe pad 758 connected to the probe driver 753 and in contact with the target substrate SUB, and a plurality of probe jigs 751 connected to the probe pad 758 to transmit electrical signals.

The probe driver 753 may be disposed on the base frame 790 to move the probe pad 758. In an embodiment, the probe driver 753 may move the probe pad 758 in a horizontal direction and a vertical direction, for example, such as the first direction DR1 as the horizontal direction and the third direction DR3 as the vertical direction. The probe pad 758 may be connected to or disconnected from the target substrate SUB by driving the probe driver 753. During the printing process using the inkjet printing apparatus 1000, in the process of forming the electric field on the target substrate SUB, the probe driver 753 may be driven to connect the probe pad 758 to the target substrate SUB, and in other processes, the probe driver 753 may be driven again to disconnect the probe pad 758 from the target substrate SUB.

The probe pad 758 may form an electric field on the target substrate SUB through the electrical signal transmitted from the probe jig 751. The probe pad 758 may be connected to the target substrate SUB to transmit the electric signal to the target substrate SUB to form the electric field on the target substrate SUB. As an example, the probe pad 758 may be in contact with an electrode or a power pad of the target substrate SUB, and the electrical signal of the probe jig 751 may be transmitted to the electrode or the power pad. The electric signal transmitted to the target substrate SUB may form an electric field on the target substrate SUB.

However, the probe pad 758 is not limited thereto, and may be a member that forms the electric field through the electrical signal transmitted from the probe jig 751. In other words, when the probe pad 758 receives the electric signal to form the electric field, the probe pad 758 may not be connected to the target substrate SUB.

A shape of the probe pad 758 is not particularly limited, but in an embodiment, the probe pad 758 may have a shape extending in one direction to cover the entire length of the target substrate SUB.

The probe jig 751 may be connected to the probe pad 758, and may be connected to a separate voltage applying device. The probe jig 751 may transmit an electric signal transmitted from the voltage applying device to the probe pad 758 to form an electric field on the target substrate SUB. The electrical signal transmitted to the probe jig 751 may be a voltage for forming the electric field.

Although two probe jigs 751 are illustrated as being disposed, the probe unit 750 may include a larger number of probe jigs 751 to form an electric field having a higher density on the target substrate SUB.

The probe unit 750 is not limited thereto. Although the probe unit 750 is illustrated as being included in the stage unit 700, and disposed on the base frame 790, the probe unit 750 may be disposed as a separate device in some embodiments. The structure or arrangement of the stage unit 700 is not particularly limited, as long as it may include a device capable of forming an electric field to form the electric field on the target substrate SUB.

Figure 11:
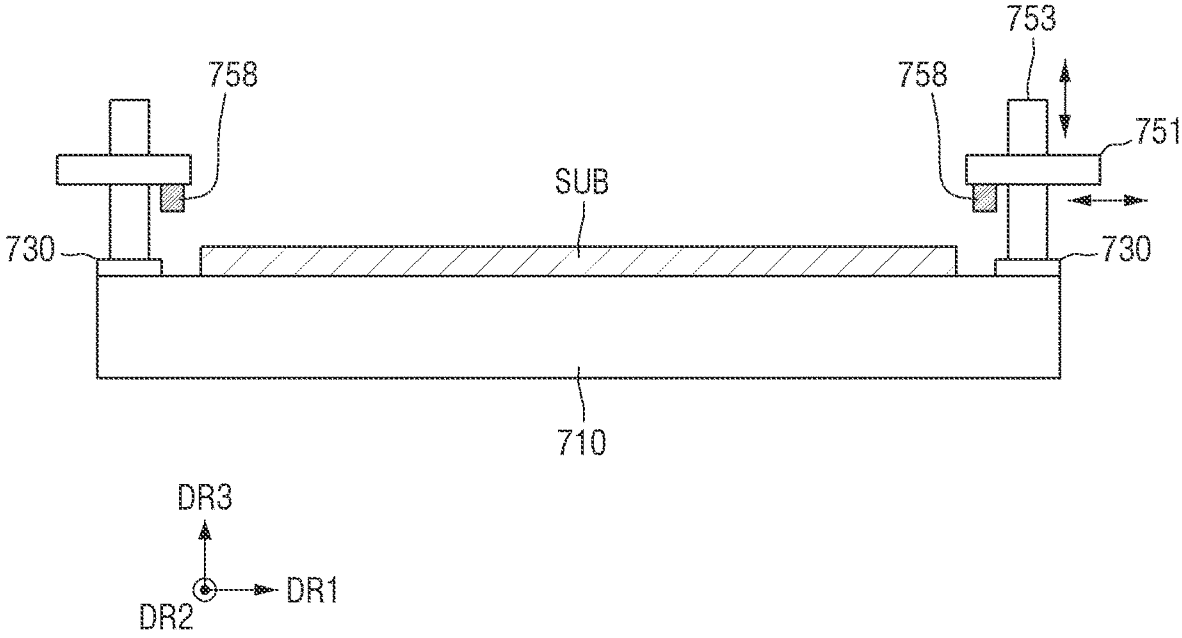
FIGS. 11-12 are schematic views illustrating operations of a probe unit according to an embodiment.
Figure 12:
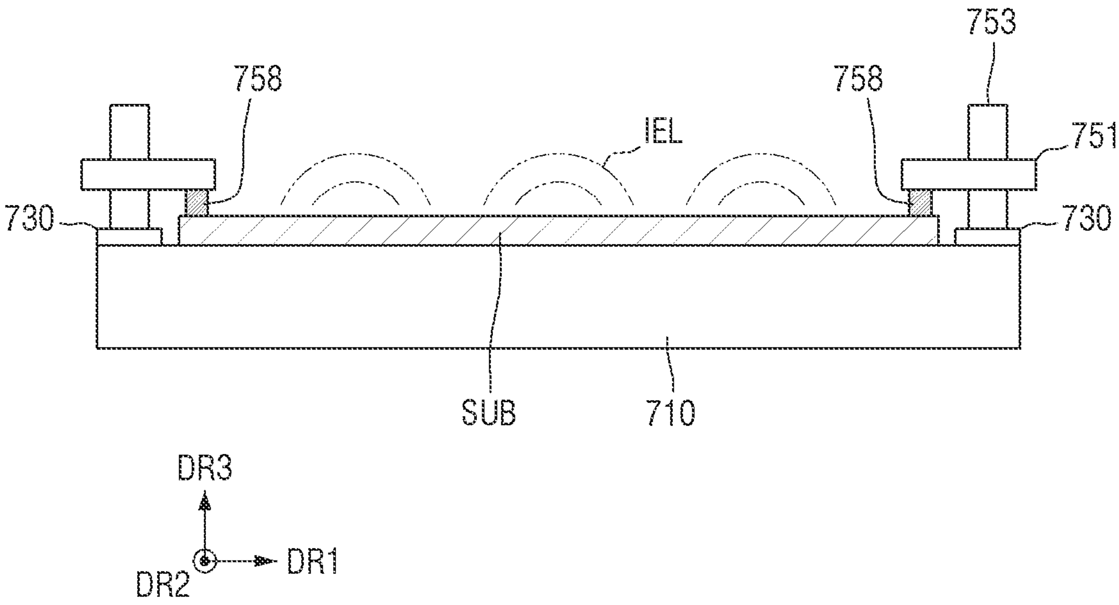

FIGS. 11 and 12 are schematic views illustrating operations of a probe unit according to an embodiment.

As described above, the probe driver 753 of the probe unit 750 may be operated according to a process of the inkjet printing apparatus 1000. Referring to FIGS. 11 and 12, in a first state in which an electric field is not formed in the stage unit 700, the probe unit 750 may be disposed on the probe support 730 to be spaced apart from the target substrate SUB. The probe driver 753 of the probe unit 750 may be driven in the second direction DR2, which is the horizontal direction, and the third direction DR3, which is the vertical direction, to separate the probe pad 758 from the target substrate SUB.

Next, in a second state of forming an electric field on the target substrate SUB, the probe driver 753 of the probe unit 750 may be driven to connect the probe pad 758 to the target substrate SUB. For example, the probe driver 753 may be driven in the third direction DR3, which is the vertical direction, and the first direction DR1, which is the horizontal direction, such that the probe pad 758 may be in contact with the target substrate SUB. The probe jig 751 of the probe unit 750 may transmit an electrical signal to the probe pad 758, and an electric field may be formed on the target substrate SUB.

For convenience, FIG. 12 illustrates that one probe unit 750 is disposed on each of opposite sides of the stage unit 700, and two probe units 750 are concurrently (e.g., simultaneously or substantially simultaneously) connected to the target substrate SUB. However, the present disclosure is not limited thereto, and each of a plurality of probe units 750 may be separately driven. For example, when the target substrate SUB is prepared on the stage 710 and the composition 90 for ink is sprayed, the probe unit 750 disposed on a left side may first form an electric field on the target substrate SUB, and the probe unit 750 disposed on a right side may not be connected to the target substrate SUB.

Thereafter, the probe unit 750 disposed on the left side may be disconnected from the target substrate SUB, and the probe unit 750 disposed on the right side may be connected to the target substrate SUB to form an electric field. In other words, the plurality of probe units 750 may be concurrently (e.g., simultaneously or substantially simultaneously) driven to form the electric field, or may be sequentially driven to sequentially form the electric field.

Figure 13:
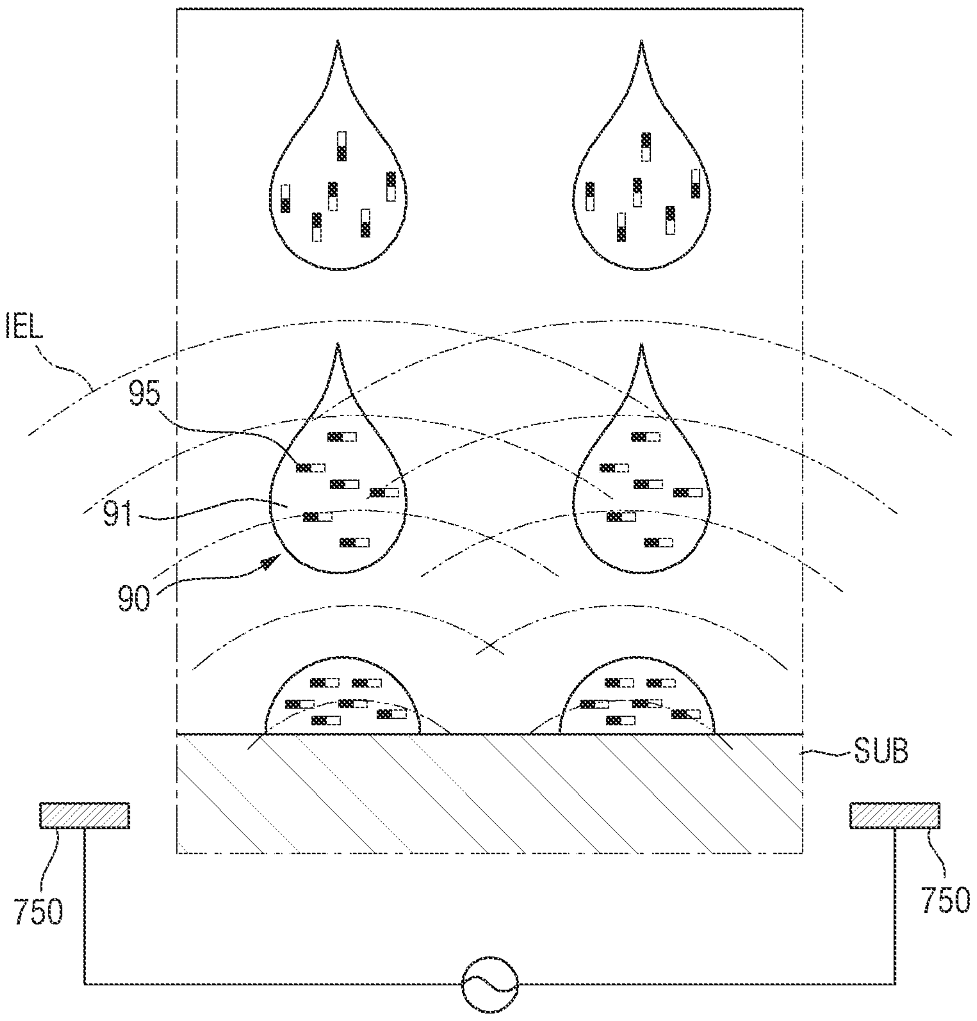
FIG. 13 is a schematic view illustrating an electric field generated on a target substrate by a probe device according to an embodiment.

FIG. 13 is a schematic view illustrating an electric field generated on a target substrate by a probe device according to an embodiment.

Referring to FIG. 13, as described above, the bipolar element 95 includes a first end and a second end, each having a polarity, and when the bipolar element 95 is placed in an electric field (e.g., a predetermined electric field), a dielectrophoretic force is transmitted thereto, so that the position or orientation direction thereof may be changed. The plurality of bipolar elements 95 in the composition 90 for ink sprayed onto the target substrate SUB may be seated on the target substrate SUB, while the positions and orientation directions thereof are changed by an electric field IEL generated by the stage unit 700.

The stage unit 700 may generate the electric field IEL on the target substrate SUB, and the composition 90 for ink discharged from the nozzle 125 of the inkjet head 120 may pass through the electric field IEL to be sprayed onto the target substrate SUB. The bipolar element 95 may receive the dielectrophoretic force by the electric field IEL until the composition 90 for ink reaches the target substrate SUB, or even after the composition 90 for ink has reached the target substrate SUB. According to an embodiment, after the bipolar element 95 is discharged from the inkjet head 120, the orientation direction and position thereof may be changed by the electric field IEL generated by the stage unit 700.

The electric field IEL generated by the stage unit 700 may be formed in a direction parallel to or substantially parallel to an upper surface of the target substrate SUB. The bipolar elements 95 sprayed onto the target substrate SUB may be oriented, such that a direction in which a major axis is extended by the electric field IEL is parallel to or substantially parallel to the upper surface of the target substrate SUB. In addition, the bipolar elements 95 may be seated on the target substrate SUB with the first end having the polarity oriented in a desired direction (e.g., a predetermined or specific direction).

When the plurality of bipolar elements 95 are seated on the target substrate SUB, the degree of alignment may be measured in consideration of a deviation in the orientation direction of the plurality of bipolar elements 95, or a deviation in a position in which the plurality of bipolar elements 95 are seated on the target substrate SUB. For the bipolar elements 95 seated on the target substrate SUB, the deviation in the orientation direction and the deviation in the seated position of other bipolar elements 95 with respect to any one bipolar element 95 may be measured, and the degree of alignment of the bipolar elements 95 may be measured. The 'degree of alignment' of the bipolar elements 95 may refer to a deviation in the alignment direction and the seated position of the bipolar elements 95 aligned on the target substrate SUB. For example, it may be understood that when the deviation in the orientation direction and the seated position of the bipolar elements 95 is large, the degree of alignment of the bipolar elements 95 is low, and when the deviation in the orientation direction and the seated position of the bipolar elements 95 is small, the degree of alignment of the bipolar elements 95 is high or improved.

A point of time at which the stage unit 700 generates the electric field IEL on the target substrate SUB is not particularly limited. The drawings illustrate that the probe unit 750 generates the electric field IEL while the composition 90 for ink is discharged from the nozzle 125 and reaches the target substrate SUB. Accordingly, the bipolar element 95 may receive a dielectrophoretic force by the electric field IEL until it is discharged from the nozzle 125 and reaches the target substrate SUB. However, the present disclosure is not limited thereto, and in some cases, the probe unit 750 may also generate the electric field IEL after the composition 90 for ink is seated on the target substrate SUB. In other words, the stage unit 700 may generate the electric field IEL when the composition 90 for ink is sprayed from the inkjet head 120, or after the composition 90 for ink is sprayed from the inkjet head 120.

In some embodiments, an electric field generating member may be further disposed on the stage 710. The electric field generating member may form an electric field on an upper portion (e.g., in the third direction DR3) or on the target substrate SUB like the probe unit 750, which will be described in more detail below. In an embodiment, as the electric field generating member, an antenna unit (e.g., an antenna) or a device including a plurality of electrodes may be applied.

In some embodiments, the inkjet printing apparatus 1000 according to an embodiment may further include a heat treatment unit, in which a process of volatilizing the composition 90 for ink sprayed on the target substrate SUB is performed. The heat treatment unit irradiates heat to the composition 90 for ink sprayed on the target substrate SUB, so that the solvent 91 of the composition 90 for ink may be volatilized and removed, and the bipolar elements 95 may be disposed on the target substrate SUB. The process of removing the solvent 91 by irradiating the composition 90 for ink with heat may be performed using a general heat treatment unit as would be understood by those having ordinary skill in the art.

Hereinafter, other embodiments of the inkjet printing apparatus will be described in more detail. In the following embodiments, redundant description of the same or substantially the same members and configurations as those described above may not be repeated or may be simplified, and the differences therebetween may be mainly described.

Figure 14:
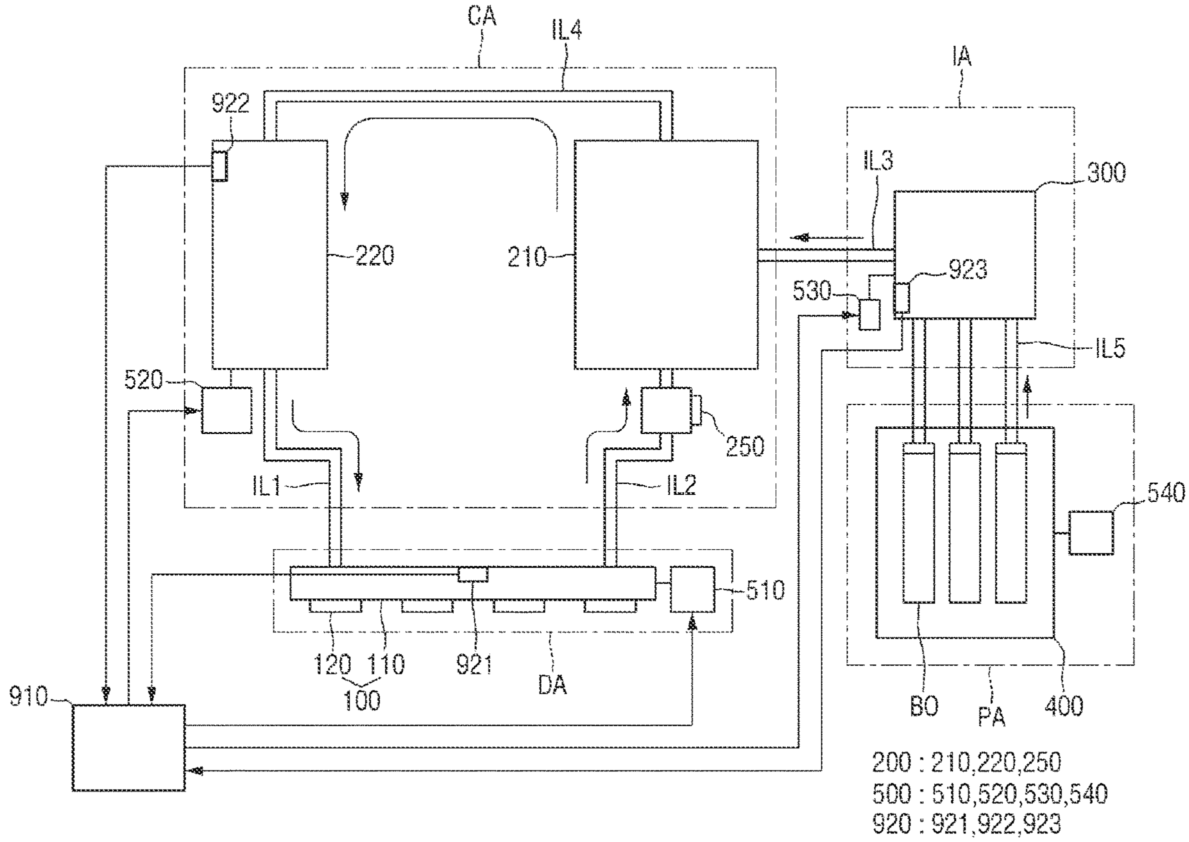
FIG. 14 is a partial side view of an inkjet printing apparatus according to another embodiment.

FIG. 14 is a partial side view of an inkjet printing apparatus according to another embodiment.

Referring to FIGS. 1 and 14, the present embodiment is different from the embodiment of FIG. 2, in that the inkjet printing apparatus further includes a control unit (e.g., a controller) for controlling the temperature adjusting unit, and a temperature sensor for sensing the temperature of the composition for ink.

In more detail, the inkjet printing apparatus 1000 according to the present embodiment may further include a control unit (e.g., a controller) 910 and a temperature sensor 920.

The control unit 910 may compare temperature data sensed by the temperature sensor 920 with the reference temperature region (e.g., RT1 through RT4), and may control the temperature adjusting unit 500, so that the temperature of the corresponding area is included in the reference temperature region when the temperature data is not included in (e.g., is outside of) the reference temperature region.

The temperature sensor 920 may include a first temperature sensor 921 disposed in the spray area DA, a second temperature sensor 922 disposed in the circulation area CA, and a third temperature sensor 923 disposed in the injection area IA.

The first temperature sensor 921 may be disposed in the spray area DA to sense the temperature of the spray area DA. In an embodiment, the first temperature sensor 921 may be provided in the print head unit 100 to sense the temperature of the fourth composition 90D for ink (e.g., see FIG. 8). The first temperature sensor 921 may transmit a measured temperature of the fourth composition 90D for ink to the control unit 910.

The control unit 910 may compare the measured temperature of the fourth composition 90D for ink received from the first temperature sensor 921 with the fourth reference temperature region RT4. When the measured temperature of the fourth composition 90D for ink is not included in the fourth reference temperature region RT4, the control unit 910 may control the first temperature adjusting unit 510, so that the temperature of the fourth composition 90D for ink is included in the fourth reference temperature region RT4.

The second temperature sensor 922 may be disposed in the circulation area CA to sense the temperature of the circulation area CA. In an embodiment, the second temperature sensor 922 may be provided in the first ink storage unit 220 to sense the temperature of the third composition 90C for ink (e.g., see FIG. 8). The second temperature sensor 922 may transmit a measured temperature of the third composition 90C for ink to the control unit 910.

The control unit 910 may compare the measured temperature of the third composition 90C for ink received from the second temperature sensor 922 with the third reference temperature region RT3. When the measured temperature of the third composition 90C for ink is not included in the third reference temperature region RT3, the control unit 910 may control the second temperature adjusting unit 520, so that the temperature of the third composition 90C for ink is included in the third reference temperature region RT3.

The third temperature sensor 923 may be disposed in the injection area IA to sense the temperature of the injection area IA. In an embodiment, the third temperature sensor 923 may be provided in the ink injection unit 300 to sense the temperature of the second composition 90B for ink (e.g., see FIG. 8). The third temperature sensor 923 may transmit a measured temperature of the second composition 90B for ink to the control unit 910.

The control unit 910 may compare the measured temperature of the second composition 90B for ink received from the third temperature sensor 923 with the second reference temperature region RT2. When the measured temperature of the second composition 90B for ink is not included in the second reference temperature region RT2, the control unit 910 may control the third temperature adjusting unit 530, so that the temperature of the second composition 90B for ink is included in the second reference temperature region RT2.

According to the present embodiment, as the inkjet printing apparatus 1000 further includes the control unit 910, and the temperature sensor 920 that senses the temperature of each area and transmits the measured temperature to the control unit 910, the temperature of each area of the inkjet printing apparatus 1000 may be controlled and fed back in real time or near real time, even during the printing process. Therefore, the reliability of the printing process may be improved.

Figure 15:
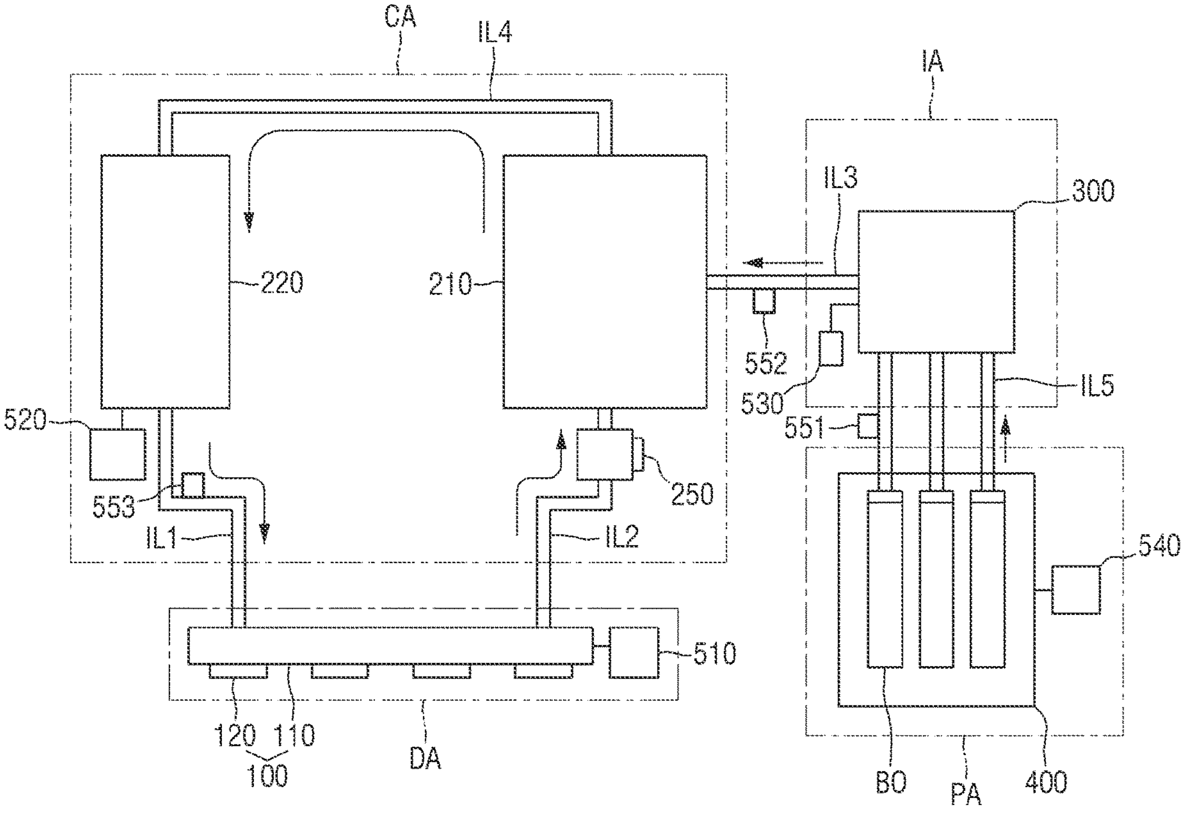
FIG. 15 is a partial side view of an inkjet printing apparatus according to another embodiment.

FIG. 15 is a partial side view of an inkjet printing apparatus according to another embodiment.

Referring to FIGS. 1 and 15, the present embodiment is different from the embodiment of FIG. 2, in that the inkjet printing apparatus further includes temperature control units (e.g., temperature controllers) disposed in the connecting tubes to control the temperature of each of the connecting tubes.

In more detail, a temperature adjusting unit (e.g., a temperature adjusting controller) 5001 may further include a fifth temperature adjusting unit (e.g., a fifth temperature adjusting controller) 551, a sixth temperature adjusting unit (e.g., a sixth temperature adjusting controller) 552, and a seventh temperature adjusting unit (e.g., a seventh temperature adjusting controller) 553.

The fifth temperature adjusting unit 551 may be disposed at (e.g., in or on) the fifth connecting tube IL5. The fifth temperature adjusting unit 551 may adjust the temperature of the composition 90 for ink supplied from the ink preparation unit 400 to the ink injection unit 300. In order to reduce the time it takes to change the first composition 90A for ink with high viscosity to the second composition 90B for ink with low viscosity by adjusting the temperature of the first composition 90A for ink with high viscosity, the fifth temperature adjusting unit 551 may indirectly control the temperature of the composition 90 for ink flowing through the fifth connecting tube IL5 by heating the fifth connecting tube IL5. In an embodiment, when the first composition 90A for ink is in a solid state, it may take a long time to change the first composition 90A for ink in the solid state to the second composition 90B for ink with low viscosity in a liquid or colloid state. Therefore, by heating the fifth connecting tube IL5, the time it takes to change the first composition 90A for ink in the solid state to the second composition 90B for ink in the liquid or colloid state may be reduced.

The sixth temperature adjusting unit 552 may be disposed at (e.g., in or on) the third connecting tube IL3. The sixth temperature adjusting unit 552 may adjust the temperature of the composition 90 for ink supplied from the ink injection unit 300 to the ink circulation unit 200.

The seventh temperature adjusting unit 553 may be disposed at (e.g., in or on) the first connecting tube IL1. The seventh temperature adjusting unit 553 may adjust the temperature of the composition 90 for ink supplied from the first ink storage unit 220 to the print head unit 100.

According to the present embodiment, as the inkjet printing apparatus 1000 further includes the temperature adjusting units for adjusting the temperature of each connecting tube, the temperature of the composition 90 for ink that flows and moves in the inkjet printing apparatus 1000 may also be controlled, so that the composition 90 for ink having improved quality may be provided.

FIGS. 16 through 19 are cross-sectional views illustrating a method for printing a bipolar element using an inkjet printing apparatus according to an embodiment.

The method for printing the bipolar element 95 according to an embodiment may be performed using the inkjet printing apparatus 1000 described above with reference to FIG. 1, and the bipolar elements 95 may be discharged by adjusting the temperature of the composition 90 for ink discharged from the inkjet head 120. In the present specification, the 'printing' of the bipolar elements 95 may refer to a process of discharging or spraying the bipolar elements 95 on to an object (e.g., a predetermined object) from the inkjet printing apparatus 1000. For example, printing the bipolar elements 95 may refer to a process of directly discharging the bipolar elements 95 through the nozzle 125 of the inkjet head 120, or discharging the bipolar elements 95 in a dispersed state in the composition 90 for ink. The present disclosure is not limited thereto, and printing the bipolar elements 95 may mean that the bipolar elements 95 or the composition 90 for ink are seated on the target substrate SUB by spraying the bipolar elements 95 or the composition 90 for ink in which the bipolar elements 95 are dispersed onto the target substrate SUB.

First, the inkjet printing apparatus 1000 is initialized.

In more detail, the process of initializing (e.g., setting) the inkjet printing apparatus 1000 is a process of tuning the inkjet printing apparatus 1000 to suit a target process. For precise tuning, an inkjet printing test process may be performed on an inspection substrate, and a value (e.g., a set or adjustable value) of the inkjet printing apparatus 1000 may be adjusted according to the result.

In more detail, an inspection substrate is prepared. The inspection substrate may have the same or substantially the same structure as that of the target substrate SUB, but a bare substrate, such as a glass substrate, may also be used.

Then, water-repellent treatment is performed on an upper surface of the inspection substrate. The water-repellent treatment may be performed by fluorine coating or plasma surface treatment.

Then, the composition 90 for ink including the bipolar elements 95 is sprayed on the upper surface of the inspection substrate using the inkjet printing apparatus 1000, and an amount of droplets for each inkjet head 120 is measured. The measurement of the amount of droplets for each inkjet head 120 may be performed by using a camera to check a size of the droplet at the sprayed moment and a size of the droplet applied to the substrate. When the measured amount of droplets is different from a reference amount of droplets, a voltage for each inkjet head 120 is adjusted, so that the reference amount of droplets may be discharged. Such an inspection method may be repeated several times, until each inkjet head 120 discharges an accurate or desired amount of droplets.

However, the present disclosure is not limited thereto, and the process of initializing (e.g., setting) the inkjet printing apparatus described above may be omitted as needed or desired.

Figure 16:
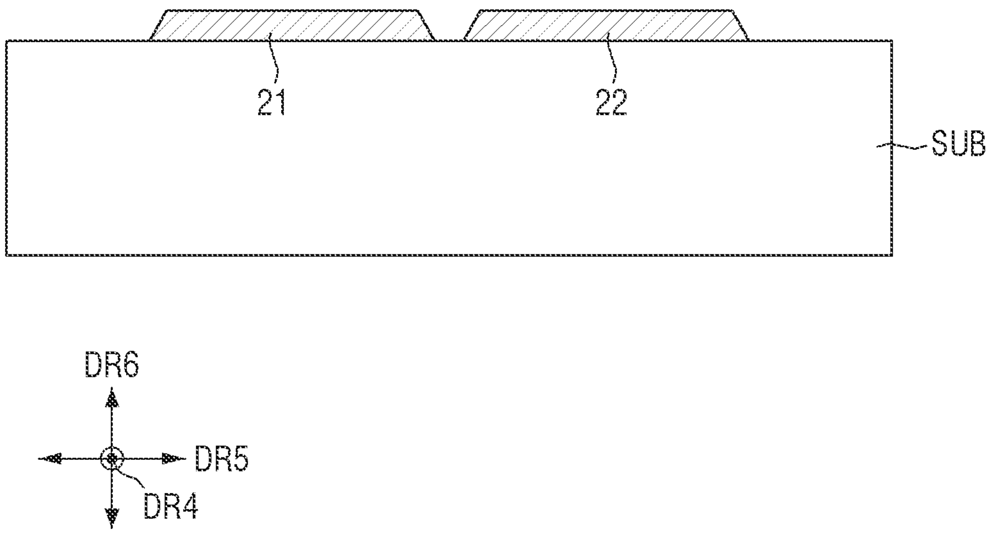
FIGS. 16-19 are cross-sectional views illustrating a method for printing a bipolar element using an inkjet printing apparatus according to an embodiment.

Then, as illustrated in FIG. 16, the target substrate SUB is prepared.

In an embodiment, a first electrode 21 and a second electrode 22 may be disposed on the target substrate SUB. Although it is illustrated in the drawings that a pair of electrodes are disposed, a larger number of pairs of electrodes may be formed on the target substrate SUB, and the plurality of inkjet heads 120 may spray the composition 90 for ink to each pair of electrodes in the same or substantially the same manner as each other.

Figure 17:
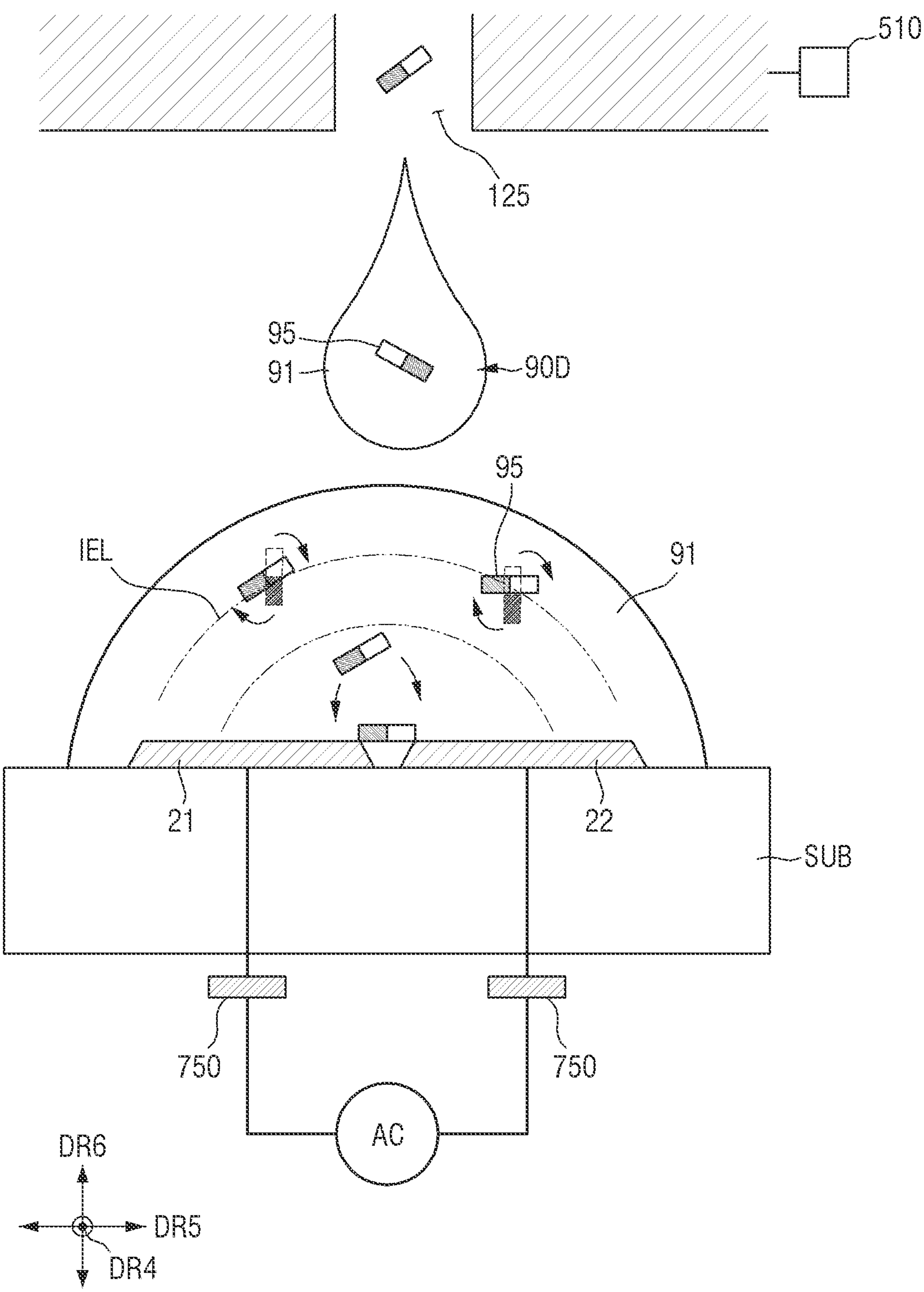

Then, as illustrated in FIG. 17, the composition for ink including the solvent 91 in which the bipolar elements 95 are dispersed is sprayed on the target substrate SUB at a temperature within the fourth reference temperature region RT4.

In more detail, the temperature of the fourth composition 90D for ink in the inkjet head 120 may be adjusted to be included in the fourth reference temperature region RT4 described above by controlling the temperature of the inkjet head 120 using the first temperature adjusting unit 510. The temperature of the fourth composition 90D for ink sprayed from the inkjet head 120 using the inkjet printing apparatus 1000 may be a temperature higher than the melting point temperature of the composition 90 for ink.

The fourth composition 90D for ink may be sprayed from the inkjet head 120 onto the first electrode 21 and the second electrode 22 disposed on the target substrate SUB. The bipolar elements 95 dispersed in the fourth composition 90D for ink may be sprayed onto the target substrate SUB while extending in one direction. In some embodiments, the bipolar elements 95 dispersed in the fourth composition 90D for ink may be oriented in a direction in which the extending direction is perpendicular to or substantially perpendicular to the upper surface of the target substrate SUB. In addition, in some embodiments, each of the bipolar elements 95 may be sprayed in an aligned or substantially aligned state, such that a first end having a first polarity or a second end having a second polarity thereof has the same direction as each other. However, the present disclosure is not limited thereto.

When the fourth composition 90D for ink in which the bipolar elements 95 are dispersed is sprayed onto the target substrate SUB, an electric field IEL is generated on the target substrate SUB. The bipolar elements 95 may be seated on the target substrate SUB while being oriented in one direction by the electric field IEL. In some embodiments, the bipolar elements 95 may be disposed between the first electrode 21 and the second electrode 22 by receiving a dielectrophoretic force by the electric field IEL generated on the target substrate SUB.

Figure 18:
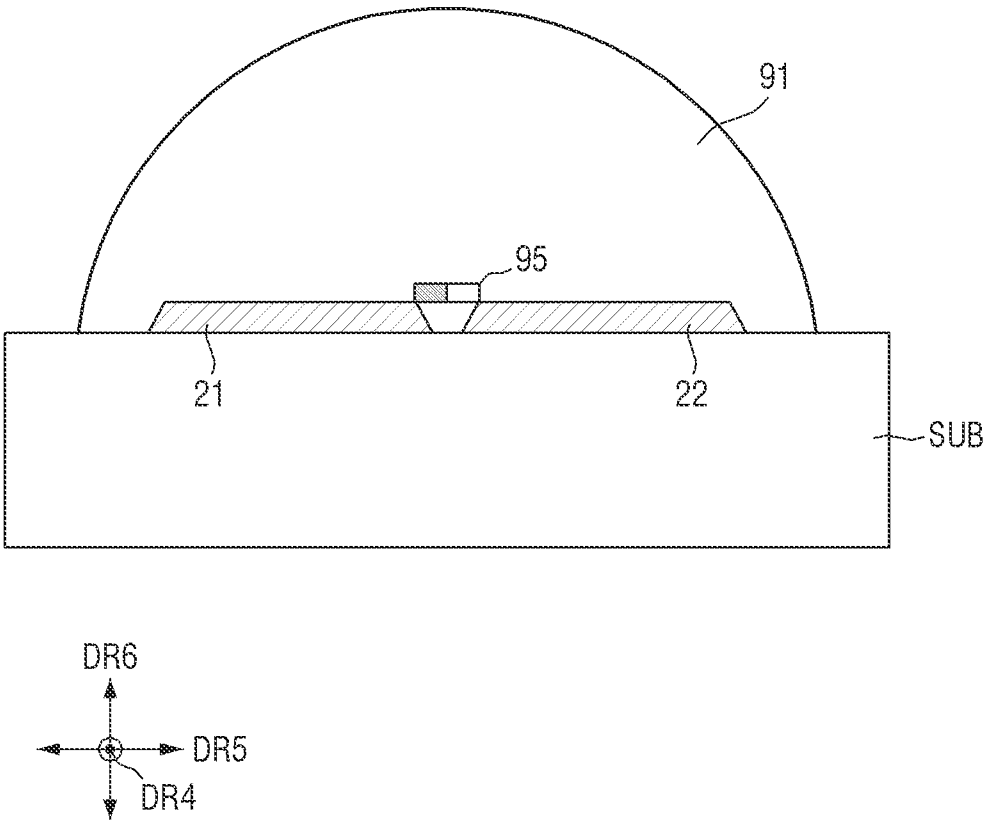

In more detail, an electric signal is applied to the first electrode 21 and the second electrode 22 using the probe unit 750. The probe unit 750 may be connected to a pad (e.g., a predetermined pad) provided on the target substrate SUB, and may apply an electrical signal to the first electrode 21 and the second electrode 22 connected to the pad. When the electric signal is applied to the first electrode 21 and the second electrode 22, an electric field IEL is formed between the first electrode 21 and the second electrode 22, and the bipolar elements 95 receives a dielectrophoretic force by the electric field IEL. The bipolar elements 95 receiving the dielectrophoretic force may land, so that opposite ends thereof are disposed on the first electrode 21 and the second electrode 22 as illustrated in FIG. 18, while the orientation direction and position thereof are changed.

As illustrated in the drawings, the orientation direction of the bipolar elements 95 having a shape extending in one direction in the composition 90 for ink may be changed according to a direction of the electric field IEL. According to an embodiment, the bipolar elements 95 may be aligned, so that one extended direction thereof is directed toward a direction in which the electric field IEL is directed. When the electric field IEL generated on the target substrate SUB is generated parallel to or substantially parallel to the upper surface of the target substrate SUB, the bipolar elements 95 may be aligned so that the extending direction thereof is parallel to or substantially parallel to the target substrate SUB, and may be disposed between the first electrode 21 and the second electrode 22. In some embodiments, the process of orienting the bipolar elements 95 is a process of seating the bipolar elements 95 between the first electrode 21 and the second electrode 22, and at least one end of the bipolar element 95 may be disposed on at least one of the first electrode 21 or the second electrode 22. However, the present disclosure is not limited thereto, and the bipolar element 95 may be directly disposed on the target substrate SUB between the first electrode 21 and the second electrode 22.

Figure 19:
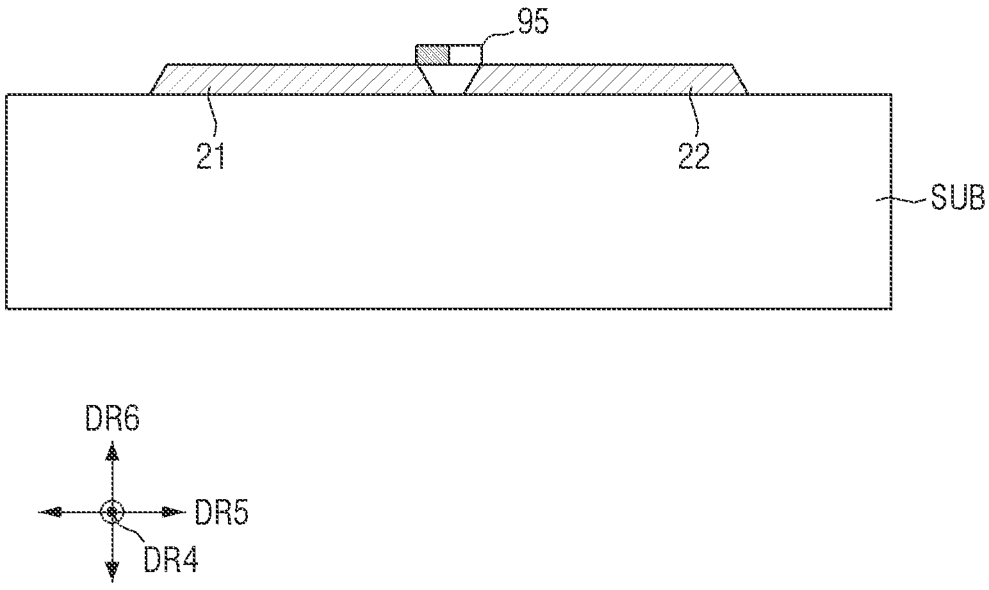

Then, as illustrated in FIG. 19, the solvent 91 of the composition 90 for ink sprayed on the target substrate SUB is removed. The process of removing the solvent 91 is performed through a heat treatment device, which may irradiate heat or infrared rays onto the target substrate SUB. As the solvent 91 is removed from the composition 90 for ink sprayed on the target substrate SUB, the flow of the bipolar elements 95 may be prevented or reduced, and the bipolar elements 95 may be seated on the electrodes 21 and 22.

Figure 20:
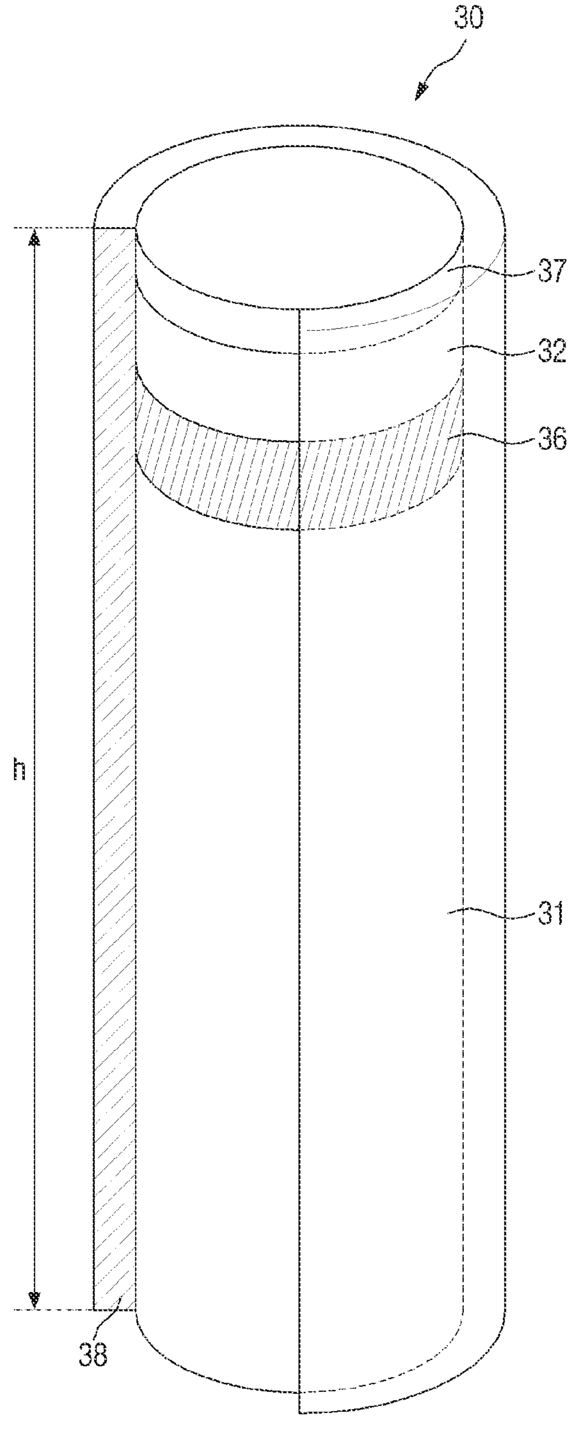
FIG. 20 is a schematic view of a light emitting element according to an embodiment.

FIG. 20 is a schematic view of a light emitting element according to an embodiment.

The light emitting element 30 may be a light emitting diode. In more detail, the light emitting element 30 may be an inorganic light emitting diode having a size of a micrometer to a nano-meter (e.g., in a range of micro-meters to nano-meters), and include (e.g., is made of) an inorganic material. The inorganic light emitting diode may be aligned between two electrodes in which polarities are formed when an electric field is formed in a desired direction (e.g., a predetermined or specific direction) between the two electrodes facing each other. The light emitting element 30 may be aligned between the two electrodes by the electric field formed on the two electrodes.

The light emitting element 30 according to an embodiment may have a shape extending in one direction. The light emitting element 30 may have a suitable shape, such as a rod shape, a wire shape, or a tube shape. In an embodiment, the light emitting element 30 may have a cylindrical shape or a rod shape. However, the shape of the light emitting element 30 is not limited thereto, and the light emitting element 30 may have various suitable shapes, such as a polygonal prismatic shape such as a cubic shape, a rectangular parallelepiped shape, or a hexagonal prismatic shape, or a shape extending in one direction and having a partially inclined outer surface.

The light emitting element 30 may include a semiconductor layer doped with an arbitrary conductivity-type (e.g., p-type or n-type) impurity. The semiconductor layer may receive an electrical signal applied from an external power source to emit light in a desired wavelength band (e.g., a predetermined or specific wavelength band).

Referring to FIG. 20, the light emitting element 30 according to an embodiment may include a first semiconductor layer 31, a second semiconductor layer 32, an active layer 36, an electrode layer 37, and an insulating film 38.

The first semiconductor layer 31 may be an n-type semiconductor. As an example, when the light emitting element 30 emits light in a blue wavelength band, the first semiconductor layer 31 may include a semiconductor material having a chemical formula of $Al_xGa_yIn_{1-x-y}N$ ($0 \le x \le 1$, $0 \le y \le 1$, and $0 \le x+y \le 1$). For example, the semiconductor material may be any one or more of AlGaInN, GaN, AlGaN, InGaN, AlN, and InN doped with an n-type. The first semiconductor layer 31 may be doped with an n-type dopant, which may be, for example, Si, Ge, Sn, or the like. In an embodiment, the first semiconductor layer 31 may be n-GaN doped with n-type Si. A length of the first semiconductor layer 31 may be in the range of 1.5 μm to 5 μm, but is not limited thereto.

The second semiconductor layer 32 is disposed on an active layer 36 described in more detail below. The second semiconductor layer 32 may be a p-type semiconductor, and as an example, when the light emitting element 30 emits light in a blue or green wavelength band, the second semiconductor layer 32 may include a semiconductor material having a chemical formula of $Al_xGa_yIn_{1-x-y}N$ ($0 \le x \le 1$, $0 \le y \le 1$, and $0 \le x+y \le 1$). For example, the semiconductor material may be any one or more of AlGaInN, GaN, AlGaN, InGaN, AlN, and InN doped with a p-type. The second semiconductor layer 32 may be doped with a p-type dopant, which may be, for example, Mg, Zn, Ca, Se, Ba, or the like. In an embodiment, the second semiconductor layer 32 may be p-GaN doped with p-type Mg. A length of the second semiconductor layer 32 may be in the range of 0.05 μm to 0.10 μm, but is not limited thereto.

The first semiconductor layer 31 and the second semiconductor layer 32 are illustrated in the drawings as each being configured as one layer, but the present disclosure is not limited thereto. According to some embodiments, each of the first semiconductor layer 31 and the second semiconductor layer 32 may further include a larger number of layers, for example, such as a clad layer or a tensile strain barrier reducing (TSBR) layer, according to a material of the active layer 36.

The active layer 36 is disposed between the first semiconductor layer 31 and the second semiconductor layer 32. The active layer 36 may include a material having a single quantum well structure or multiple quantum well structure. When the active layer 36 includes the material having the multiple quantum well structure, the active layer 36 may have a structure in which a plurality of quantum layers and well layers are alternately stacked. The active layer 36 may emit light by a combination of electron-hole pairs according to electrical signals applied through the first semiconductor layer 31 and the second semiconductor layer 32. As an example, when the active layer 36 emits light in a blue wavelength band, the active layer 36 may include a material such as AlGaN or AlGaInN. In more detail, when the active layer 36 has a structure in which the quantum layers and the well layers are alternately stacked as in the multiple quantum well structure, the quantum layers may include a material such as AlGaN or AlGaInN, and the well layers may include a material such as GaN or AlInN. In an embodiment, the active layer 36 may include AlGaInN as the quantum layers and AlInN as the well layers to emit blue light having a central wavelength band of 450 nm to 495 nm as described above.

However, the present disclosure is not limited thereto, and the active layer 36 may have a structure in which a type of semiconductor material having a large band gap energy and a semiconductor material having a small band gap energy are alternately stacked with each other, and may include other Group III to Group V semiconductor materials according to a desired wavelength band of emitted light. The light emitted by the active layer 36 is not limited to the light in the blue wavelength band, and in some cases, the active layer 36 may emit light in a red or green wavelength band. A length of the active layer 36 may be in the range of 0.05 μm to 0.10 μm, but is not limited thereto.

The light emitted from the active layer 36 may be emitted not only to outer surfaces of the light emitting element 30 in a length direction, but also to both side surfaces of the light emitting element 30. The direction of the light emitted from the active layer 36 is not limited to one direction.

The electrode layer 37 may be an ohmic contact electrode. However, the present disclosure is not limited thereto, and the electrode layer 37 may be a Schottky contact electrode. The light emitting element 30 may include at least one electrode layer 37. Although FIG. 20 illustrates that the light emitting element 30 includes one electrode layer 37, the present disclosure is not limited thereto. In some embodiments, the light emitting element 30 may include a larger number of electrode layers 37, or the electrode layer 37 may be omitted. The light emitting element 30 described in more detail below may be equally applied even if the number of electrode layers 37 is changed or the light emitting element 30 further includes another structure.

The electrode layer 37 may decrease a resistance between the light emitting element 30 and the electrode or the contact electrode when the light emitting element 30 is electrically connected to the electrode or the contact electrode in a display device according to an embodiment. The electrode layer 37 may include a conductive metal. For example, the electrode layer 37 may include at least one of aluminum (Al), titanium (Ti), indium (In), gold (Au), silver (Ag), indium tin oxide (ITO), indium zinc oxide (IZO), or indium tin zinc oxide (ITZO). In addition, the electrode layer 37 may include a semiconductor material doped with an n-type or a p-type. The electrode layer 37 may include the same material or different materials, but is not limited thereto.

The insulating film 38 is disposed to surround (e.g., around peripheries of) outer surfaces of the plurality of semiconductor layers and electrode layers described above. In an embodiment, the insulating film 38 may be disposed to surround (e.g., around a periphery of) at least an outer surface of the active layer 36, and may extend in one direction in which the light emitting element 30 extends. The insulating film 38 may perform a function of protecting the members. As an example, the insulating film 38 may be formed to surround (around peripheries of) side surface portions of the members, but may be formed to expose opposite ends of the light emitting element 30 in the length direction thereof.

Although it is illustrated in the drawings that the insulating film 38 is formed to extend in the length direction of the light emitting element 30 to cover side surfaces of the first semiconductor layer 31 to the electrode layer 37, the present disclosure is not limited thereto. The insulating film 38 may cover only outer surfaces of some of the semiconductor layers, including the active layer 36, or may cover only a portion of the electrode layer 37 to partially expose the outer surface of each electrode layer 37. In addition, the insulating film 38 may also be formed so that an upper surface thereof is rounded in a cross section in an area adjacent to at least one end of the light emitting element 30.

A thickness of the insulating film 38 may be in the range of 10 nm to 1.0 μm, but is not limited thereto. The thickness of the insulating film 38 may be about 40 nm.

The insulating film 38 may include suitable materials having insulating properties, such as silicon oxide (SiOx), silicon nitride (SiNx), silicon oxynitride (SiOxNy), aluminum nitride (AlN), and/or aluminum oxide (AlxOy). Accordingly, an electrical short circuit that may occur when the active layer 36 is in direct contact with an electrode through which an electrical signal is transmitted to the light emitting element 30 may be prevented or substantially prevented. In addition, because the insulating film 38 protects the outer surface of the light emitting element 30 including the active layer 36, a decrease in luminous efficiency may be prevented or reduced.

In addition, in some embodiments, an outer surface of the insulating film 38 may be surface-treated. When the display device 10 is manufactured, the light emitting elements 30 may be sprayed onto the electrode in a state of being dispersed in an ink (e.g., a predetermined ink) to be aligned. Here, in order for the light emitting elements 30 to maintain or substantially maintain the dispersed state without being aggregated with other adjacent light emitting elements 30 in the ink, a hydrophobic or hydrophilic treatment may be performed on a surface of the insulating film 38.

The light emitting element 30 may have a length (h) of 1 μm to 10 μm or 2 μm to 6 μm, for example, such as 3 μm to 5 μm. In addition, a diameter of the light emitting element 30 may be in the range of 30 nm to 700 nm, and an aspect ratio of the light emitting element 30 may be 1.2 to 100. However, the present disclosure is not limited thereto, and the plurality of light emitting elements 30 included in the display device 10 may also have different diameters according to a difference in composition of the active layer 36. For example, the diameter of the light emitting element 30 may be about 500 nm.

According to an embodiment, the inkjet printing apparatus 1000 may disperse the light emitting element 30 illustrated in FIG. 20 in the composition 90 for ink, and then spray or discharge the composition 90 for ink onto the target substrate SUB, thereby, manufacturing the display device 10 including the light emitting element 30.

Figure 21:
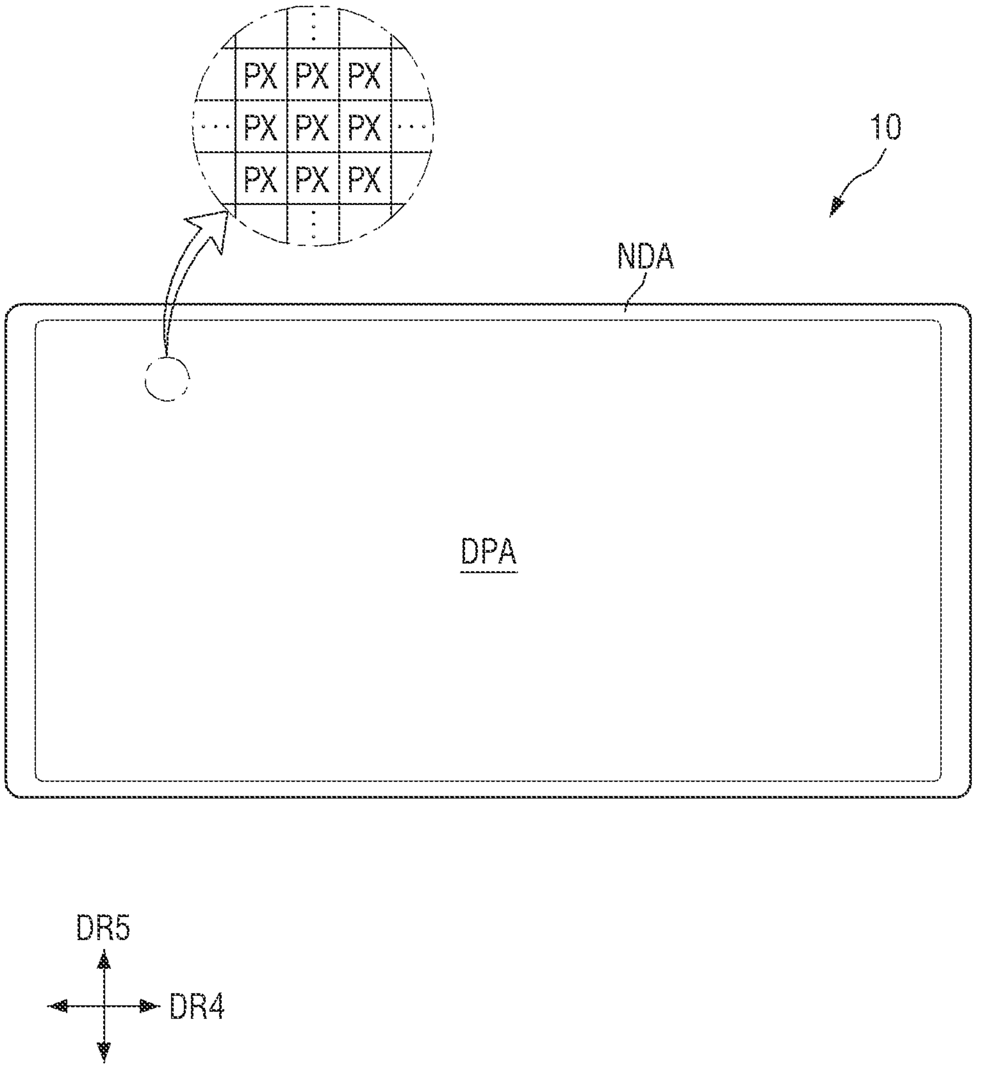
FIG. 21 is a schematic plan view of a display device according to an embodiment.

FIG. 21 is a schematic plan view of a display device according to an embodiment.

Referring to FIG. 21, the display device 10 displays a moving image and/or a still image. The display device 10 may refer to any suitable electronic device that provides a display screen. For example, the display device 10 may include televisions, laptop computers, monitors, billboards, Internet of things devices, mobile phones, smartphones, tablet personal computers (PCs), electronic watches, smartwatches, watch phones, head mounted displays, mobile communication terminals, electronic notebooks, electronic books, portable multimedia players (PMPs), navigation devices, game consoles, digital cameras, camcorders, and the like, that provide the display screen.

A shape of the display device 10 may be variously modified as needed or desired. For example, the display device 10 may have a suitable shape, such as a rectangle having a longer width, a rectangle having a longer length, a square, a quadrangle with rounded corners (e.g., vertices), other suitable polygons, or a circle. A shape of a display area DPA of the display device 10 may also be the same or substantially the same as (or similar to) an overall shape of the display device 10. In FIG. 21, the display device 10 and the display area DPA that have a rectangular shape have a longer width are illustrated.

The display device 10 may include the display area DPA and a non-display area NDA. The display area DPA is an area in which a screen may be displayed, and the non-display area NDA is an area in which a screen is not displayed. The display area DPA may be referred to as an active area, and the non-display area NDA may be referred to as a non-active area.

The display area DPA may generally occupy the center of the display device 10. The display area DPA may include a plurality of pixels PX. The plurality of pixels PX may be arranged in a matrix (e.g., a matrix direction). A shape of each pixel PX may be a rectangular shape or a square shape in a plan view, but is not limited thereto, and may be a rhombic shape of which each side is inclined with respect to one direction. Each of the pixels PX may include one or more light emitting elements 30 emitting light in a desired wavelength band (e.g., a predetermined or specific wavelength band) to display a desired color (e.g., a predetermined or specific color).

Figure 22:
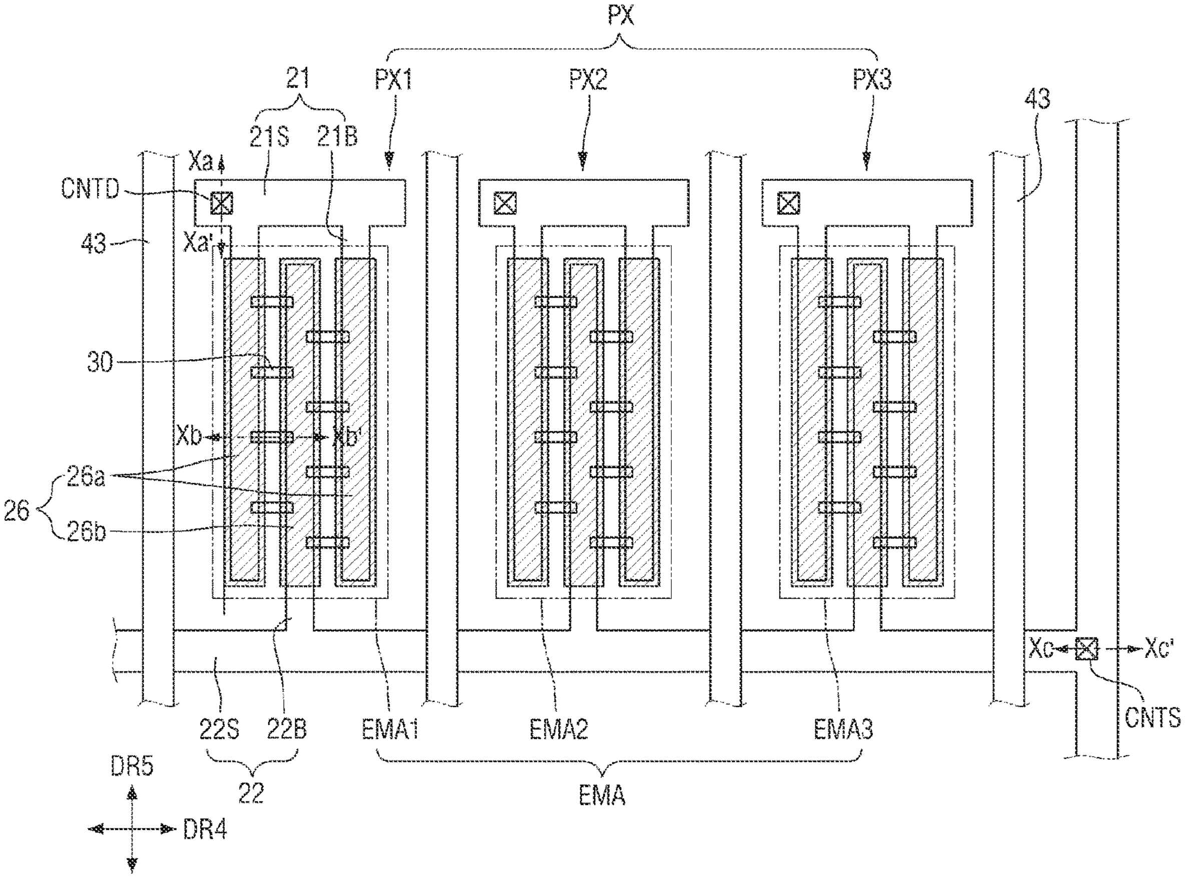
FIG. 22 is a schematic plan view of a pixel of the display device according to an embodiment.
Figure 23:
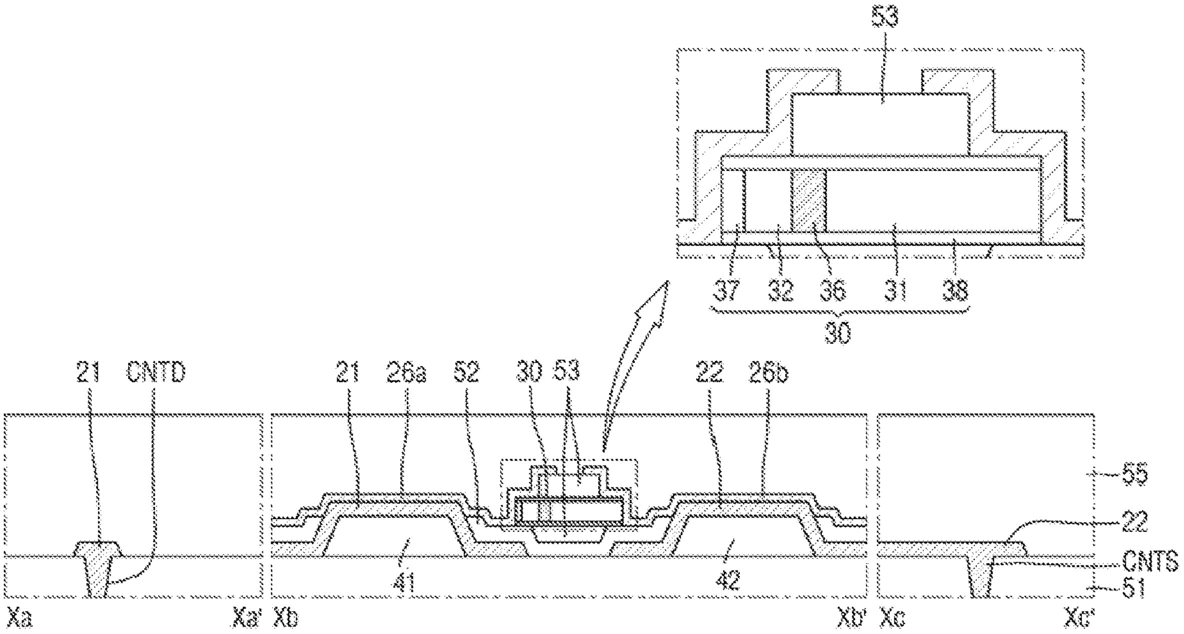
FIG. 23 is a cross-sectional view taken along the line Xa-Xa', the line Xb-Xb', and the line Xc-Xc' of FIG. 22.

FIG. 22 is a schematic plan view of a pixel of the display device according to an embodiment. FIG. 23 is a cross-sectional view taken along the line Xa-Xa', the line Xb-Xb', and the line Xc-Xc' of FIG. 22.

Referring to FIG. 22, each of the plurality of pixels PX may include a first sub-pixel PX1, a second sub-pixel PX2, and a third sub-pixel PX3 (which may also be referred to as a sub-pixel PXn hereinafter). The first sub-pixel PX1 may emit light of a first color, the second sub-pixel PX2 may emit light of a second color, and the third sub-pixel PX3 may emit light of a third color. The first color may be blue, the second color may be green, and the third color may be red, but the present disclosure is not limited thereto, and each of the sub-pixels PXn may emit light of the same or substantially the same color as each other. In addition, although it is illustrated in FIG. 22 that the pixel PX includes three sub-pixels PXn, the present disclosure is not limited thereto, and the pixel PX may include a larger number of sub-pixels PXn.

Each of the sub-pixels PXn of the display device 10 may include an area defined as a light emitting area EMA. The first sub-pixel PX1 may include a first light emitting area EMA1, the second sub-pixel PX2 may include a second light emitting area EMA2, and the third sub-pixel PX3 may include a third light emitting area EMA3. The light emitting area EMA may be defined as an area in which the light emitting element 30 included in the display device 10 is disposed to emit light in a desired wavelength band (e.g., a predetermined or specific wavelength band).

Each of the sub-pixels PXn of the display device 10 may include a non-light emitting area defined as an area other than the light emitting area EMA. The non-light emitting area may be an area in which the light emitting elements 30 are not disposed, and the light emitted from the light emitting elements 30 does not arrive, and thus, the light is not emitted.

Referring to FIGS. 22 and 23, each sub-pixel PXn of the display device 10 may include a plurality of electrodes 21 and 22, light emitting elements 30, a plurality of contact electrodes 26, a plurality of first banks 41 and 42, a second bank 43, and at least one insulating layer 51, 52, 53, and 55.

The plurality of electrodes 21 and 22 may be electrically connected to the light emitting elements 30, and may receive a suitable voltage (e.g., a predetermined voltage), so that the light emitting elements 30 emit light in a desired wavelength band (e.g., a predetermined or specific wavelength band). In addition, at least a portion of each of the electrodes 21 and 22 may be utilized to form an electric field in the sub-pixel PXn to align the light emitting elements 30.

The plurality of electrodes 21 and 22 may include a first electrode 21 and a second electrode 22. In an embodiment, the first electrode 21 may be a pixel electrode that is separated (e.g., spaced apart) for each sub-pixel PXn, and the second electrode 22 may be a common electrode that is commonly connected along each sub-pixel PXn. However, the present disclosure is not limited thereto, and both the first electrode 21 and the second electrode 22 may also be separated (e.g., spaced apart) for each sub-pixel PXn.

The first electrode 21 and the second electrode 22 may include electrode stem portions 21S and 22S disposed to extend in the fourth direction DR4, respectively, and at least one electrode branch portion 21B and 22B extending and branching from the electrode stem portions 21S and 22S in a fifth direction DR5, which is a direction crossing (e.g., intersecting) the fourth direction DR4.

The first electrode 21 may include a first electrode stem portion 21S disposed to extend in the fourth direction DR4, and at least one first electrode branch portion S21B branching from the first electrode stem portion 21S and extending in the fifth direction DR5.

The first electrode stem portion 21S of the pixel PX may have opposite ends that are spaced apart from each other and terminated between adjacent sub-pixels PXn, and may be arranged in the same or substantially the same straight line as that of a first electrode stem portion 21S of a sub-pixel neighboring (e.g., an adjacent sub-pixel) in the same row (e.g., adjacent in the fourth direction DR4). As the first electrode stem portion 21S disposed in each sub-pixel PXn have opposite ends that are spaced apart from each other, different electrical signals may be applied to the first electrode branch portions 21B, respectively, and the first electrode branch portions 21B may be separately driven from each other.

The first electrode branch portion 21B may branch from at least a portion of the first electrode stem portion 21S, and may be disposed to extend in the fifth direction DR5. The first electrode branch portion 21B may be terminated in a state in which it is spaced apart from the second electrode stem portion 22S disposed to face the first electrode stem portion 21S.

The second electrode 22 may include a second electrode stem portion 22S extending in the fourth direction DR4, and spaced apart from and facing the first electrode stem portion 21S in the fifth direction DR5, and a second electrode branch portion 22B branching from the second electrode stem portion 22S and extending in the fifth direction DR5. The second electrode stem portion 22S may have another end connected to a second electrode stem portion 22S of another sub-pixel PXn adjacent thereto in the fourth direction DR4. In other words, the second electrode stem portion 22S may be disposed to extend in the fourth direction DR4 to cross each sub-pixel PXn arranged in the same row as each other, unlike that of the first electrode stem portion 21S. The second electrode stem portion 22S crossing each sub-pixel PXn arranged in the same row as each other may be connected to an outer portion of the display area DPA in which the pixels PX or sub-pixels PXn are disposed, or to a portion extending from the non-display area NDA in one direction.

The second electrode branch portion 22B may be spaced apart from and face the first electrode branch portion 21B, and may be terminated in a state in which it is spaced apart from the first electrode stem portion 21S. The second electrode branch portion 22B may be connected to the second electrode stem portion 22S, and an end of the second electrode branch portion 22B in an extending direction may be disposed in the sub-pixel PXn in a state in which it is spaced apart from the first electrode stem portion 21S.

The first electrode 21 and the second electrode 22 may be electrically connected to a circuit element layer of the display device 10 through contact holes, for example, such as through a first electrode contact hole CNTD and a second electrode contact hole CNTS, respectively. It is illustrated in the drawings that the first electrode contact hole CNTD is formed for each of the first electrode stem portions 21S of each sub-pixel PXn, and one second electrode contact hole CNTS is formed in one second electrode stem portion 22S crossing each sub-pixel PXn in the same row as each other. However, the present disclosure is not limited thereto, and in some embodiments, the second electrode contact hole CNTS may also be formed for each sub-pixel PXn.

The second bank 43 may be disposed at a boundary between the sub-pixels PXn, and the plurality of first banks 41 and 42 may be disposed on a lower side of the electrodes 21 and 22 that are adjacent to a central portion of each sub-pixel PXn. A first sub-bank 41 and a second sub-bank 42 may be disposed on the lower sides of the first electrode branch portion 21B and the second electrode branch portion 22B, respectively.

The second bank 43 may be disposed at the boundary between the sub-pixels PXn, and each end of the plurality of first electrode stem portions 21S may be spaced apart from each other and terminated with respect to the second bank 43. The second bank 43 may extend in the fifth direction DR5, and may be disposed at the boundary between the sub-pixels PXn that are arranged along the fourth direction DR4. However, the present disclosure is not limited thereto, and the second bank 43 may extend in the fourth direction DR4, and may be disposed at a boundary between the sub-pixels PXn that are arranged along the fifth direction DR5. The second banks 43 may include the same material as that of the first banks 41 and 42, and may be formed concurrently (e.g., simultaneously or substantially simultaneously) with the first banks 41 and 42 in a single process (e.g., in the same process as each other).

The light emitting elements 30 may be disposed between the first electrode 21 and the second electrode 22. One end of the light emitting element 30 may be electrically connected to the first electrode 21, and another end of the light emitting element 30 may be electrically connected to the second electrode 22. The light emitting element 30 may be electrically connected to the first electrode 21 and the second electrode 22 through contact electrodes 26 described in more detail below, respectively.

The plurality of light emitting elements 30 may be disposed to be spaced apart from each other, and may be aligned to be parallel to or substantially parallel to each other. An interval between the light emitting elements 30 that are spaced apart from each other is not particularly limited. In some cases, a plurality of light emitting elements 30 may be disposed to be adjacent to each other and may be grouped with each other, and a plurality of other light emitting elements 30 may be grouped with each other in a state in which they are spaced apart from each other by a suitable interval (e.g., a predetermined interval), and may have a non-uniform density, but may also be oriented and aligned with each other in one direction. In addition, in an embodiment, the light emitting element 30 may have a shape extending in one direction, and a direction in which the light emitting element 30 extends and a direction in which the electrodes, for example, such as the first electrode branch portion 21B and the second electrode branch portion 22B, extend may be perpendicular to or substantially perpendicular to each other. However, the present disclosure is not limited thereto, and the light emitting element 30 may be disposed to be inclined without being perpendicular to or substantially perpendicular to the direction in which the first electrode branch portion 21B and the second electrode branch portion 22B extend.

The light emitting element 30 according to an embodiment may include the active layer 36 including different materials to emit light in different wavelength bands to the outside. In the display device 10, the light emitting element 30 of the first sub-pixel PX1 may emit first light having a first wavelength in a central wavelength band, the light emitting element 30 of the second sub-pixel PX2 may emit second light having a second wavelength in a central wavelength band, and the light emitting element 30 of the third sub-pixel PX3 may emit third light having a third wavelength in a center wavelength band. Accordingly, the first light may be emitted from the first sub-pixel PX1, the second light may be emitted from the second sub-pixel PX2, and the third light may be emitted from the third sub-pixel PX3. In some embodiments, the first light may be blue light having the central wavelength band in the range of 450 nm to 495 nm, the second light may be green light having the central wavelength band in the range of 495 nm to 570 nm, and the third light may be red light having the central wavelength band in the range of 620 nm to 750 nm. However, the present disclosure is not limited thereto.

The display device 10 may include a second insulating layer 52 covering at least portions of the first electrode 21 and the second electrode 22.

The second insulating layer 52 may be disposed on each sub-pixel PXn of the display device 10. The second insulating layer 52 may be disposed to entirely or substantially entirely cover each sub-pixel PXn, and may also be disposed to extend to other neighboring (e.g., adjacent) sub-pixels PXn. The second insulating layer 52 may be disposed to cover at least portions of the first electrode 21 and the second electrode 22. The second insulating layer 52 may be disposed to expose portions of the first electrode 21 and the second electrode 22, for example, such as partial areas of the first electrode branch portion 21B and the second electrode branch portion 22B.

The plurality of contact electrodes 26 may have a shape in which at least partial areas thereof extend in one direction. Each of the plurality of contact electrodes 26 may be in contact with the light emitting elements 30 and the electrodes 21 and 22, and the light emitting elements 30 may receive the electrical signals from the first electrode 21 and the second electrode 22 through the contact electrodes 26.

The contact electrode 26 may include a first contact electrode **26*a* and a second contact electrode 26*b*. The first contact electrode 26*a* and the second contact electrode 26*b* may be disposed on the first electrode branch portion 21B and the second electrode branch portion 22**B, respectively.

The first contact electrode **26*a* may be disposed on the first electrode 21 or the first electrode branch portion 21B, and may extend in the fifth direction DR5. The first contact electrode 26*a* may be in contact with one end of the light emitting element 30. In addition, the first contact electrode 26*a* may be in contact with the first electrode 21 that is exposed without the second insulating layer 52 disposed thereon. Accordingly, the light emitting element 30 may be electrically connected to the first electrode 21 through the first contact electrode 26*a***.

The second contact electrode **26*b* may be disposed on the second electrode 22 or the second electrode branch portion 22B, and may extend in the fifth direction DR5. The second contact electrode 26*b* may be spaced apart from the first contact electrode 26*a* in the fourth direction DR4. The second contact electrode 26*b* may be in contact with another end of the light emitting element 30. In addition, the second contact electrode 26*b* may be in contact with the second electrode 22 that is exposed without the second insulating layer 52 disposed thereon. Accordingly, the light emitting element 30 may be electrically connected to the second electrode 22 through the second contact electrode 26*b*. Although it is illustrated in the drawings that two first contact electrodes 26*a* and one second contact electrode 26*b* are disposed in one sub-pixel PXn, the present disclosure is not limited thereto. The numbers of first contact electrodes 26*a* and second contact electrodes 26*b* may be variously modified depending on the numbers of the first electrodes 21 and the second electrodes 22, or the numbers of the first electrode branch portions 21B and second electrode branch portions 22**B disposed in each sub-pixel PXn.

In some embodiments, widths of the first contact electrode **26*a* and the second contact electrode 26*b* measured in one direction may be greater than widths of the first electrode 21 and the second electrode 22 or the first electrode branch portion 21B and the second electrode branch portion 22B measured in the one direction, respectively. However, the present disclosure is not limited thereto, and in some embodiments, the first contact electrode 26*a* and the second contact electrode 26*b* may also be disposed to cover only one side portions of the first electrode branch portion 21B and the second electrode branch portion 22**B.

The display device 10 may include a circuit element layer positioned on a lower side of each of the electrodes 21 and 22, a third insulating layer 53 disposed to cover at least portions of the respective electrodes 21 and 22 and the light emitting element 30, and a passivation layer 55, in addition to the second insulating layer 52. Hereinafter, a cross-sectional structure of the display device 10 will be described in more detail with reference to FIG. 23.

FIG. 23 illustrates a cross-section of the first sub-pixel PX1, but the other pixels PX or the other sub-pixels PXn may have the same or substantially the same structure as that of the first sub-pixel PX1 illustrated in FIG. 23. FIG. 23 illustrates a cross section crossing one end and another end of the light emitting element 30 disposed in the first sub-pixel PX1.

As described above, the display device 10 may further include a circuit element layer positioned on a lower side of each of the electrodes 21 and 22. The circuit element layer may include a plurality of semiconductor layers and a plurality of conductive patterns, and may include at least one transistor and a power supply line.

Referring to FIGS. 22 and 23, the display device 10 may include the first insulating layer 51, and the electrodes 21 and 22 and the light emitting element 30 disposed on the first insulating layer 51. A circuit element layer may be further disposed on a lower side of the first insulating layer 51. The first insulating layer 51 may include an organic insulating material, and may perform a surface planarization function.

The plurality of first banks 41 and 42, the second bank 43, the plurality of electrodes 21 and 22, and the light emitting element 30 may be disposed on the first insulating layer 51.

The second bank 43 may serve to prevent or substantially prevent the composition for ink from crossing the boundary between the sub-pixels PXn, when the composition for ink in which the light emitting elements 30 are dispersed is sprayed using the inkjet printing apparatus of FIG. 1 described above during a manufacturing process of the display device 10. The second bank 43 may separate the compositions for ink in which different light emitting elements 30 are dispersed for each of the different sub-pixels PXn, so as not to be mixed with each other. However, the present disclosure is not limited thereto.

The plurality of first banks 41 and 42 may include the first sub-bank 41 and the second sub-bank 42 disposed to be adjacent to a central portion of each sub-pixel PXn.

The first sub-bank 41 and the second sub-bank 42 are disposed to be spaced apart from each other, and face each other. The first electrode 21 may be disposed on the first sub-bank 41, and the second electrode 22 may be disposed on the second sub-bank 42. It may be understood that the first electrode branch portion 21B is disposed on the first sub-bank 41 and the second electrode branch portion 22B is disposed on the second sub-bank 42.

The first sub-bank 41 and the second sub-bank 42 may be disposed to extend in the fifth direction DR5 in each sub-pixel PXn. However, the present disclosure is not limited thereto, and the first sub-bank 41 and the second sub-bank 42 may be disposed for each sub-pixel PXn to form a pattern on an entire surface of the display device 10. The plurality of first banks 41 and 42 and the second bank 43 may include polyimide (PI), but are not limited thereto.

The first sub-bank 41 and the second sub-bank 42 may have a structure in which at least portions thereof protrude with respect to the first insulating layer 51. The first sub-bank 41 and the second sub-bank 42 may protrude upward with respect to a plane on which the light emitting element 30 is disposed, and at least a portion of the protruding portion may have an inclination. Because the first banks 41 and 42 protrude with respect to the first insulating layer 51 and have inclined side surfaces, the light emitted from the light emitting element 30 may be reflected on the inclined side surfaces of the first banks 41 and 42. As will be described in more detail below, when the electrodes 21 and 22 disposed on the first banks 41 and 42 include a material having high reflectance, the light emitted from the light emitting element 30 may be reflected by the electrodes 21 and 22 to travel in an upward direction of the first insulating layer 51.

The second bank 43 is disposed at the boundary between the sub-pixels PXn to form a grid pattern, and the first banks 41 and 42 are disposed within each sub-pixel PXn to have a shape extending in one direction.

The plurality of electrodes 21 and 22 may be disposed on the first insulating layer 51 and the first banks 41 and 42. As described above, each of the electrodes 21 and 22 include the electrode stem portion 21S and 22S and the electrode branch portions 21B and 22B.

Partial areas of the first electrode 21 and the second electrode 22 may be disposed on the first insulating layer 51, and other partial areas of the first electrode 21 and the second electrode 22 may be disposed on the first sub-bank 41 and the second sub-bank 42. As described above, the first electrode stem portion 21S of the first electrode 21 and the second electrode stem portion 22S of the second electrode 22 may extend in the fourth direction DR4, and the first sub-bank 41 and the second sub-bank 42 may extend in the fifth direction DR5 and may also be disposed in the sub-pixels PXn adjacent to each other in the fifth direction DR5.

A first electrode contact hole CNTD penetrating through the first insulating layer 51 and exposing a portion of the circuit element layer may be formed in the first electrode stem portion 21S of the first electrode 21. The first electrode 21 may be electrically connected to a transistor of the circuit element layer through the first electrode contact hole CNTD. The first electrode 21 may receive an electrical signal (e.g., a predetermined electrical signal) from the transistor.

The second electrode stem portion 22S of the second electrode 22 may extend in one direction to be disposed in the non-light emitting area in which the light emitting elements 30 are not disposed. A second electrode contact hole CNTS penetrating through the first insulating layer 51 and exposing a portion of the circuit element layer may be formed in the second electrode stem portion 22S. The second electrode 22 may be electrically connected to a power electrode through the second electrode contact hole CNTS. The second electrode 22 may receive an electrical signal (e.g., a predetermined electrical signal) from the power electrode.

Partial areas of the first electrode 21 and the second electrode 22, for example, such as the first electrode branch portion 21B and the second electrode branch portion 22B, may be disposed on the first sub-bank 41 and the second sub-bank 42, respectively. The plurality of light emitting elements 30 may be disposed at (e.g., in or on) an area between the first electrode 21 and the second electrode 22, or in other words, in a space where the first electrode branch portion 21B and the second electrode branch portion 22B are spaced apart from each other and face each other.

Each of the electrodes 21 and 22 may include a transparent conductive material. As an example, each of the electrodes 21 and 22 may include a suitable material, such as indium tin oxide (ITO), indium zinc oxide (IZO), or indium tin zinc oxide (ITZO), but is not limited thereto. In some embodiments, each of the electrodes 21 and 22 may include a conductive material having high reflectance. For example, each of the electrodes 21 and 22 may include a suitable metal, such as silver (Ag), copper (Cu), or aluminum (Al) as the material having the high reflectance. In this case, light incident on each of the electrodes 21 and 22 may be reflected to be emitted in an upward direction of the sub-pixel PXn.

In addition, the electrodes 21 and 22 may have a structure in which a transparent conductive material and a metal layer having high reflectance are stacked in one or more layers, or may be formed as one layer including the transparent conductive material and the metal layer having high reflectance. In an embodiment, each of the electrodes 21 and 22 may have a stacked structure of ITO/silver (Ag)/ITO/IZO, or be made of an alloy including aluminum (Al), nickel (Ni), lanthanum (La), and/or the like. However, the present disclosure is not limited thereto.

The second insulating layer 52 is disposed on the first insulating layer 51, the first electrode 21, and the second electrode 22. The second insulating layer 52 is disposed to partially cover the first electrode 21 and the second electrode 22. The second insulating layer 52 may be disposed to mostly cover upper surfaces of the first electrode 21 and the second electrode 22, but may expose portions of the first electrode 21 and the second electrode 22. The second insulating layer 52 may be disposed to expose portions of the upper surfaces of the first electrode 21 and the second electrode 22, for example, such as portions of the upper surface of the first electrode branch portion 21B disposed on the first sub-bank 41 and the upper surface of the second electrode branch portion 22B disposed on the second sub-bank 42. In other words, the second insulating layer 52 is entirely or substantially entirely formed on the first insulating layer 51, and may include an opening that partially exposes the first electrode 21 and the second electrode 22.

In an embodiment, the second insulating layer 52 may have a step formed, so that a portion of an upper surface thereof is recessed between the first electrode 21 and the second electrode 22. In some embodiments, the second insulating layer 52 may include an inorganic insulating material, and a portion of the upper surface of the second insulating layer 52 disposed to cover the first electrode 21 and the second electrode 22 may be recessed, due to a step of a member disposed on a lower side of the second insulating layer 52. An empty space may be formed between the light emitting element 30 disposed on the second insulating layer 52 between the first electrode 21 and the second electrode 22 and the recessed upper surface of the second insulating layer 52. The light emitting element 30 may be disposed to be partially spaced apart from the upper surface of the second insulating layer 52, and a material constituting a third insulating layer 53 described in more detail below may be filled in the space. However, the present disclosure is not limited thereto. The second insulating layer 52 may form a flat or substantially flat upper surface on which the light emitting element 30 is disposed.

The second insulating layer 52 may insulate the first electrode 21 and the second electrode 22 from each other, while protecting the first electrode 21 and the second electrode 22. In addition, the second insulating layer 52 may also prevent or substantially prevent the light emitting element 30 disposed on the second insulating layer 52 from being in direct contact with and/or being damaged by other members. However, the shape and structure of the second insulating layer 52 are not limited thereto.

The light emitting element 30 may be disposed on the second insulating layer 52 between the respective electrodes 21 and 22. As an example, at least one light emitting element 30 may be disposed on the second insulating layer 52 disposed between the respective electrode branch portions 21B and 22B. However, the present disclosure is not limited thereto, and in some embodiments, at least some of the light emitting elements 30 disposed in each sub-pixel PXn may also be disposed at (e.g., in or on) an area other than the area between the respective electrode branch portions 21B and 22B. The light emitting element 30 may be disposed on each end of the first electrode branch portion 21B and the second electrode branch portion 22B facing each other, and may be electrically connected to each of the electrodes 21 and 22 through the contact electrode 26.

The light emitting elements 30 may include a plurality of layers disposed in a horizontal direction with respect to the first insulating layer 51. The light emitting element 30 of the display device 10 according to an embodiment may have a shape extending in one direction, and may have a structure in which a plurality of semiconductor layers are sequentially disposed in the one direction. As described in more detail below, in the light emitting element 30, the first semiconductor layer 31, the active layer 36, the second semiconductor layer 32, and the electrode layer 37 may be sequentially disposed along the one direction, and the insulating film 38 may surround (e.g., around peripheries of) the outer surfaces of the first semiconductor layer 31, the active layer 36, the second semiconductor layer 32, and the electrode layer 37. The light emitting element 30 disposed in the display device 10 may be disposed so that the one direction in which the light emitting element 30 extends is parallel to or substantially parallel to the first insulating layer 51, and the plurality of semiconductor layers included in the light emitting element 30 may be sequentially disposed along a direction parallel to or substantially parallel to the upper surface of the first insulating layer 51. However, the present disclosure is not limited thereto. In some embodiments, when the light emitting element 30 has another structure, the plurality of layers thereof may also be disposed in a direction perpendicular to or substantially perpendicular to the first insulating layer 51.

In addition, one end of the light emitting element 30 may be in contact with the first contact electrode 26*a*, and another end of the light emitting element 30 may be in contact with the second contact electrode 26*b*. According to an embodiment, an end surface of the light emitting element 30 extending in one direction is exposed without having the insulating film 38 formed thereon, and thus, the light emitting element 30 may be in contact with the first contact electrode 26*a* and the second contact electrode 26*b* described in more detail below in the exposed area. However, the present disclosure is not limited thereto. In some embodiments, at least a partial area of the insulating film 38 of the light emitting element 30 is removed, such that side surfaces of opposite ends of the light emitting element 30 may be partially exposed.

The third insulating layer 53 may be partially disposed on the light emitting element 30 disposed between the first electrode 21 and the second electrode 22. The third insulating layer 53 may be disposed to partially surround (e.g., a periphery of) an outer surface of the light emitting element 30. The third insulating layer 53 may also perform a function of fixing the light emitting element 30 in the process of manufacturing the display device 10, while protecting the light emitting element 30. In addition, in an embodiment, a portion of the material of the third insulating layer 53 may be disposed between a lower surface of the light emitting element 30 and the second insulating layer 52. As described above, the third insulating layer 53 may be formed to fill the space between the second insulating layer 52 and the light emitting element 30 formed during the process of manufacturing the display device 10. Accordingly, the third insulating layer 53 may also be formed to surround (e.g., around a periphery of) the outer surface of the light emitting element 30. However, the present disclosure is not limited thereto.

The third insulating layer 53 may be disposed to extend in the fifth direction DR5 between the first electrode branch portion 21B and the second electrode branch portion 22B in a plan view. As an example, the third insulating layer 53 may have an island shape or a linear shape in a plan view on the first insulating layer 51. According to an embodiment, the third insulating layer 53 may be disposed on the light emitting element 30.

The first contact electrode 26*a* and the second contact electrode 26*b* are respectively disposed on the electrodes 21 and 22 and the third insulating layer 53. The first contact electrode 26*a* and the second contact electrode 26*b* may be disposed to be spaced apart from each other on the third insulating layer 53. The third insulating layer 53 may electrically insulate the first contact electrode 26*a* and the second contact electrode 26*b* from each other, so that the first contact electrode 26*a* and the second contact electrode 26*b* are not in direct contact with each other.

The first contact electrode 26*a* may be in contact with the exposed area of the first electrode 21 on the first sub-bank 41, and the second contact electrode 26*b* may be in contact with the exposed area of the second electrode 22 on the second sub-bank 42. The first contact electrode 26*a* and the second contact electrode 26*b* may transmit the electrical signals transmitted from the respective electrodes 21 and 22 to the light emitting element 30.

The contact electrode 26 may include a conductive material. For example, the contact electrode 26 may include ITO, IZO, ITZO, aluminum (Al), or the like. However, the present disclosure is not limited thereto.

The passivation layer 55 may be disposed on the contact electrode 26 and the third insulating layer 53. The passivation layer 55 may serve to protect the members disposed on the first insulating layer 51 from an external environment.

Each of the second insulating layer 52, the third insulating layer 53, and the passivation layer 55 described above may include an inorganic insulating material or an organic insulating material. In an embodiment, the second insulating layer 52, the third insulating layer 53, and the passivation layer 55 may include an inorganic insulating material, such as silicon oxide (SiOx), silicon nitride (SiNx), silicon oxynitride (SiOxNy), aluminum nitride (AlN), or aluminum oxide (AlxOy). In addition, the second insulating layer 52, the third insulating layer 53, and the passivation layer 55 may include an acrylic resin, an epoxy resin, a phenolic resin, a polyamide resin, a polyimide resin, an unsaturated polyester resin, a polyphenylene resin, a polyphenylene sulfide resin, benzocyclobutene, a cardo resin, a siloxane resin, a silsesquioxane resin, polymethylmethacrylate, polycarbonate, a polymethylmethacrylate-polycarbonate synthetic resin, or the like, as the organic insulating material. However, the present disclosure is not limited thereto.

Figure 24:
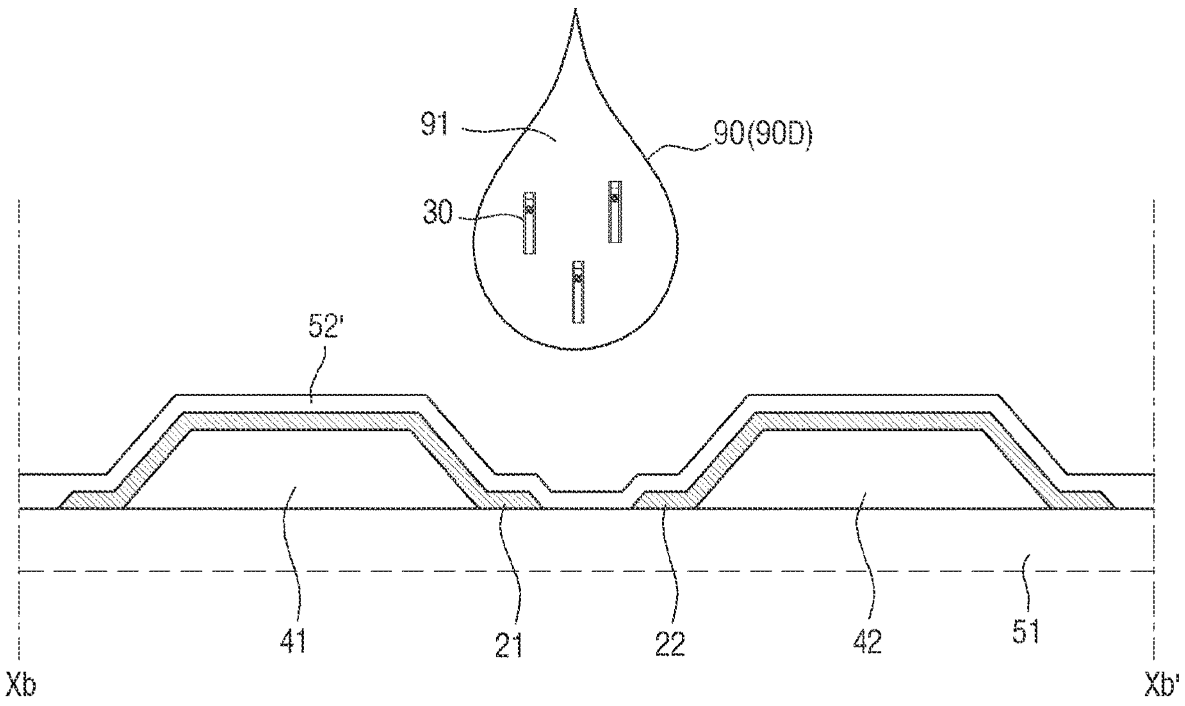
FIGS. 24-26 are cross-sectional views illustrating a portion of a method for manufacturing a display device according to an embodiment.
Figure 25:
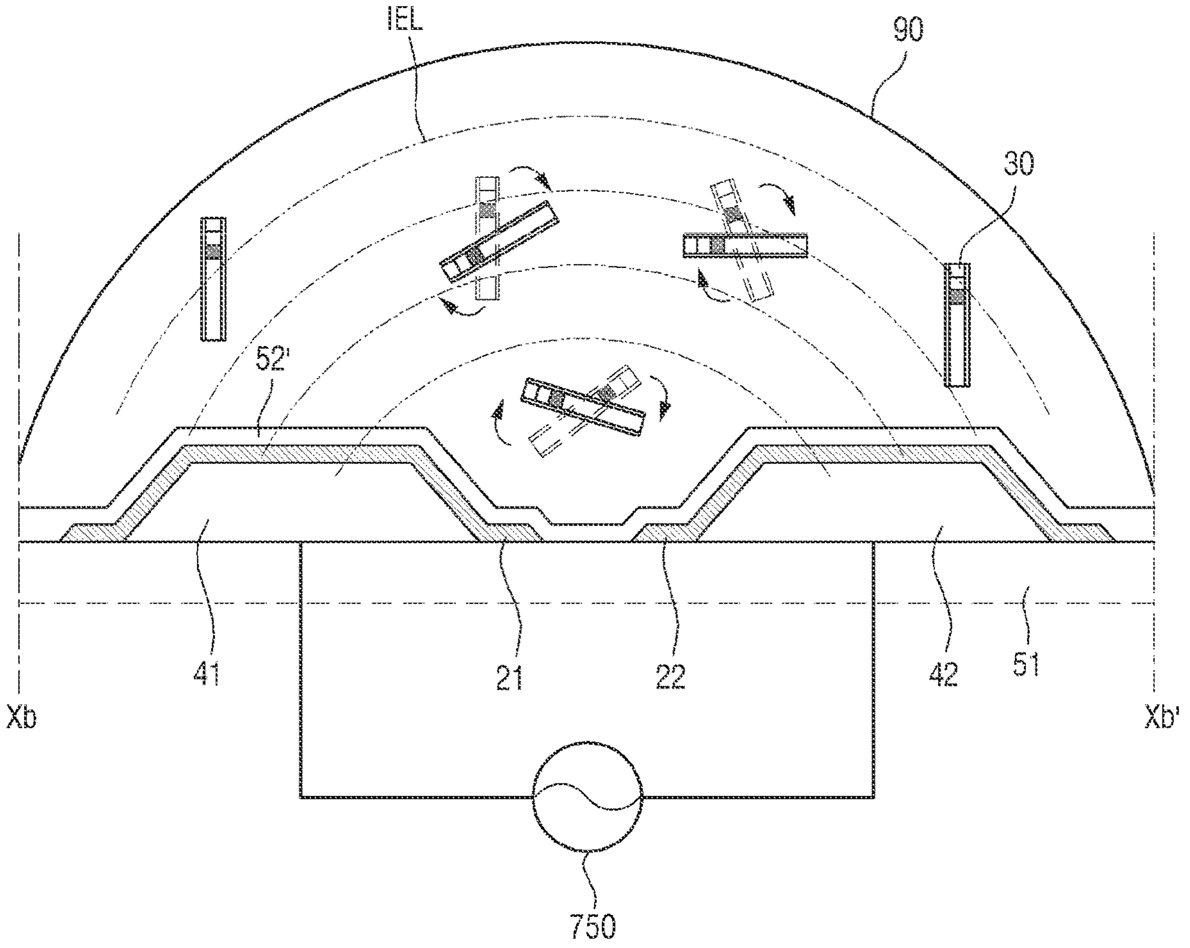
Figure 26:
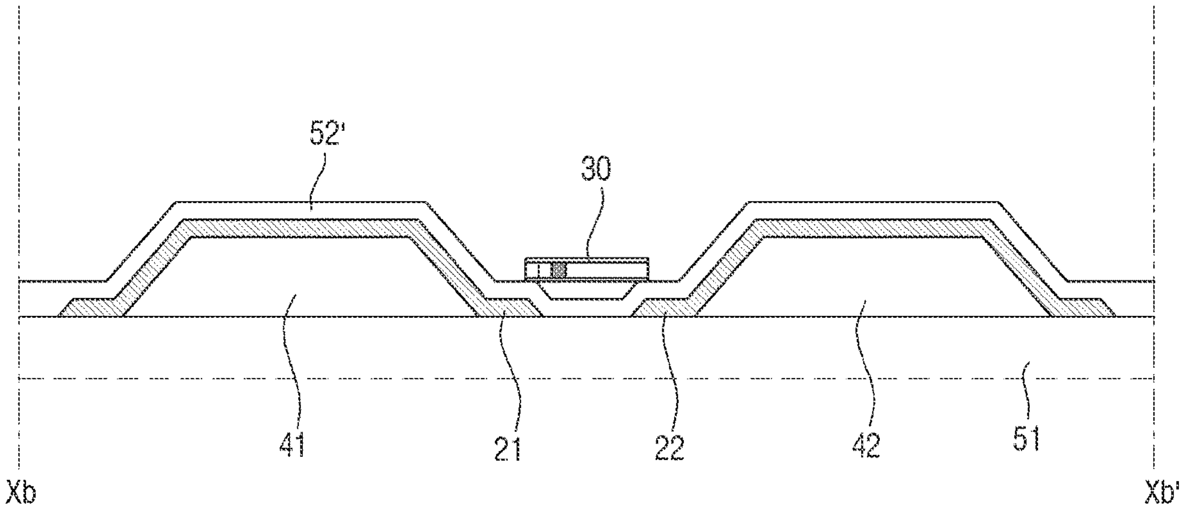

FIGS. 24 through 26 are cross-sectional views illustrating a portion of a method for manufacturing a display device according to an embodiment.

Referring to FIGS. 24 to 26, the display device 10 according to an embodiment may be manufactured using the inkjet printing apparatus 1000 described above with reference to FIG. 1. The inkjet printing apparatus 1000 may spray the composition 90 for ink in which the light emitting elements 30 are dispersed, and the light emitting element 30 may be disposed between the first electrode 21 and the second electrode 22 of the display device 10.

First, as illustrated in FIG. 24, the first insulating layer 51, the first sub-bank 41 and the second sub-bank 42 disposed to be spaced apart from each other on the first insulating layer 51, the first electrode 21 and the second electrode 22 respectively disposed on the first sub-bank 41 and the second sub-bank 42, and a second insulating material layer 52' covering the first electrode 21 and the second electrode 22 are prepared. The second insulating material layer 52' may be partially patterned in a subsequent process to form the second insulating layer 52 of the display device 10. The members may be formed by patterning a metal, an inorganic material, an organic material, or the like by a mask process.

Then, the composition 90 for ink in which the light emitting elements 30 are dispersed, or in more detail, the fourth composition 90D for ink, is sprayed on the first electrode 21 and the second electrode 22. The light emitting element 30 is a kind of bipolar element, and the spraying of the composition 90 for ink in which the light emitting elements 30 are dispersed may be performed using the inkjet printing apparatus 1000 and the method for printing the bipolar element described above. As illustrated in the drawings, the inkjet printing apparatus 1000 according to an embodiment may discharge the composition 90 for ink, while uniformly or substantially uniformly maintaining the number of light emitting elements 30 in the composition 90 for ink. A description thereof is the same or substantially the same as that described above, and thus, redundant description thereof may not be repeated.

Next, as illustrated in FIG. 25, an electric field IEL is generated in the composition 90 for ink in which the light emitting elements 30 are dispersed, by applying an electric signal to the first electrode 21 and the second electrode 22. The light emitting element 30 may be seated between the first electrode 21 and the second electrode 22 as a dielectrophoretic force is transmitted to the light emitting element 30 by the electric field IEL, and the orientation direction and position of the light emitting element 30 are changed.

Next, as illustrated in FIG. 26, the solvent 91 of the composition 90 for ink is removed. Through the processes described above, the light emitting element 30 may be disposed between the first electrode 21 and the second electrode 22. Thereafter, the display device 10 may be manufactured by patterning the second insulating material layer 52' to form the second insulating layer 52, and forming the third insulating layer 53, the first contact electrode 26*a*, the second contact electrode 26*b*, and the passivation layer 55.

However, the shape and material of the light emitting element 30 are not limited to those described above with reference to FIG. 20. In some embodiments, the light emitting element 30 may also include a larger number of layers and/or may have other various suitable shapes.

The electronic or electric devices and/or any other relevant devices or components according to embodiments of the present disclosure described herein (e.g., the control unit, the temperature control units, the temperature adjusting units, and the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

The invention claimed is:

1. An inkjet printing apparatus comprising:

a print head device comprising an inkjet head configured to spray a composition for ink including a plurality of bipolar elements;

an ink circulation device comprising an ink storage configured to store, from a first time point to a second time point later than the first time point, the composition for ink including a number of the bipolar elements dispersed per unit volume, and transfer the composition for ink to the print head device after the second time point via a connection tube connected between the ink storage and the print head device;

an ink injection device configured to inject the composition for ink into the ink storage; and a temperature adjusting device configured to adjust a temperature of the composition for ink, wherein the temperature adjusting device comprises:

a first temperature adjusting device configured to adjust a temperature of a first composition for ink in the print head device to be included in a first reference temperature range;

a second temperature adjusting device configured to adjust a temperature of a second composition for ink in the ink storage to be included in a second reference temperature range to maintain, from the first time point to the second time point, the number of the bipolar elements dispersed per unit volume; and a third temperature adjusting device configured to adjust a temperature of a third composition for ink in the ink injection device to be included in a third reference temperature range, and wherein the connection tube comprises a valve configured to adjust a flow rate of the second composition for ink provided from the ink storage to the print head device.

2. The inkjet printing apparatus of claim 1, wherein the third reference temperature range is a temperature region higher than the first reference temperature range and the second reference temperature range.

3. The inkjet printing apparatus of claim 2, wherein the first reference temperature range is a temperature region higher than the second reference temperature range.

4. The inkjet printing apparatus of claim 1, wherein a viscosity of the third composition for ink in the ink injection device is smaller than a viscosity of the first and second compositions for ink in the print head device and the ink storage.

5. The inkjet printing apparatus of claim 4, wherein the viscosity of the first composition for ink in the print head device is smaller than the viscosity of the second composition for ink in the ink storage.

6. The inkjet printing apparatus of claim 1, further comprising a controller configured to control the temperature adjusting device, wherein the controller is configured to control each temperature of the first to third compositions for ink by controlling the temperature adjusting device.

7. The inkjet printing apparatus of claim 6, further comprising:

a first temperature sensor configured to sense the temperature of the first composition for ink in the print head device;

a second temperature sensor configured to sense the temperature of the second composition for ink in the ink storage; and a third temperature sensor configured to sense the temperature of the third composition for ink in the ink injection device.

8. The inkjet printing apparatus of claim 7, wherein the controller is configured to compare a measured temperature of the first composition for ink sensed by the first temperature sensor with the first reference temperature range, and control the first temperature adjusting device so that the temperature of the first composition for ink is included in the first reference temperature range.

9. The inkjet printing apparatus of claim 7, wherein the controller is configured to compare a measured temperature of the second composition for ink sensed by the second temperature sensor with the second reference temperature range, and control the second temperature adjusting device so that the temperature of the second composition for ink is included in the second reference temperature range.

10. The inkjet printing apparatus of claim 7, wherein the controller is configured to compare a measured temperature of the third composition for ink sensed by the third temperature sensor with the third reference temperature range, and control the third temperature adjusting device so that the temperature of the third composition for ink is included in the third reference temperature range.

11. The inkjet printing apparatus of claim 1, further comprising:

an ink preparation device configured to store the composition for ink, and transfer the composition for ink to the ink injection device; and a fourth temperature adjusting device configured to adjust a temperature of a fourth composition for ink in the ink preparation device to be included in a fourth reference temperature range.

12. The inkjet printing apparatus of claim 11, wherein the fourth reference temperature range is lower than the first to third reference temperature ranges.

13. The inkjet printing apparatus of claim 12, wherein the fourth reference temperature range is a temperature lower than a melting point temperature of the composition for ink.

14. The inkjet printing apparatus of claim 11, wherein a viscosity of the fourth composition for ink is greater than viscosities of the first to third compositions for ink.

15. An inkjet printing apparatus comprising:

a spray area, a circulation area, and an injection area;

an inkjet head in the spray area, and configured to spray a composition for ink including a plurality of bipolar elements;

an ink circulation device in the circulation area, and configured to:

store, from a first time point to a second time point later than the first time point, the composition for ink including a number of the bipolar elements dispersed per unit volume;

supply the composition for ink to the inkjet head after the second time point via a connection tube connected between the ink circulation device and the inkjet head; and receive the composition for ink from the inkjet head remaining after being sprayed;

an ink injection device in the injection area, and configured to provide the composition for ink to the ink circulation device; and a temperature adjusting device configured to adjust a temperature of each of the spray area, the circulation area, and the injection area, wherein the temperature adjusting device comprises:

a first temperature adjusting device configured to adjust a first temperature of the spray area to be included in a first reference temperature region;

a second temperature adjusting device configured to adjust a second temperature of the circulation area to be included in a second reference temperature region to maintain, from the first time point to the second time point, the number of bipolar elements dispersed in the composition for ink per unit volume; and a third temperature adjusting device configured to adjust a third temperature of the injection area to be included in a third reference temperature region, and wherein the connection tube comprises a valve configured to adjust a flow rate of the composition for ink provided from the ink circulation device to the inkjet head.

16. The inkjet printing apparatus of claim 15, wherein the third reference temperature region is a temperature region higher than the first and second reference temperature regions, and wherein the first reference temperature region is a temperature region higher than the second reference temperature region.

17. The inkjet printing apparatus of claim 16, wherein the first to third reference temperature regions are temperatures higher than a melting point temperature of the composition for ink.

18. The inkjet printing apparatus of claim 15, wherein a viscosity of the composition for ink in the third reference temperature region is lower than viscosities of the composition for ink in the first and second reference temperature regions, and wherein the viscosity of the composition for ink in the first reference temperature region is lower than the viscosity of the composition for ink in the second reference temperature region.

* * * * *